US012576734B2

(12) United States Patent
Whiting et al.

(10) Patent No.: US 12,576,734 B2
(45) Date of Patent: Mar. 17, 2026

(54) AUTOMOTIVE BATTERY POWER SYSTEM

(71) Applicant: Schumacher Electric Corporation, Fort Worth, TX (US)

(72) Inventors: John Whiting, Fort Worth, TX (US); Randall Lawson, Fort Worth, TX (US); Patrick Clarke, Fort Worth, TX (US); Donald Anderson, Fort Worth, TX (US)

(73) Assignee: Schumacher Electric Corporation, Fort Worth, TX (US)

( * ) Notice: Subject to any disclaimer, the term of this patent is extended or adjusted under 35 U.S.C. 154(b) by 811 days.

(21) Appl. No.: 17/470,740

(22) Filed: Sep. 9, 2021

(65) Prior Publication Data

US 2022/0194236 A1 Jun. 23, 2022

Related U.S. Application Data

(60) Provisional application No. 63/238,668, filed on Aug. 30, 2021, provisional application No. 63/184,950, filed on May 6, 2021, provisional application No. 63/126,621, filed on Dec. 17, 2020.

(51) Int. Cl.
B60L 53/16 (2019.01)
B60L 53/66 (2019.01)

(52) U.S. Cl.
CPC .............. B60L 53/16 (2019.02); B60L 53/66 (2019.02); B60L 2250/16 (2013.01)

(58) Field of Classification Search
CPC ...................................................... B60L 53/16
USPC ........................................................ 320/104
See application file for complete search history.

(56) References Cited

U.S. PATENT DOCUMENTS

| | | | | |
|---|---|---|---|---|
| 5,614,808 A | * | 3/1997 | Konoya | B60L 53/305 |
| | | | | 320/109 |
| 2011/0234150 A1 | * | 9/2011 | Furukawa | B60L 53/51 |
| | | | | 320/101 |
| 2012/0091961 A1 | * | 4/2012 | Hani | B60L 53/65 |
| | | | | 320/109 |
| 2012/0129378 A1 | * | 5/2012 | Kiko | B60L 53/31 |
| | | | | 362/555 |
| 2016/0121747 A1 | | 5/2016 | Jefferies et al. | |
| 2019/0305476 A1 | * | 10/2019 | Kralik | H01R 43/26 |
| 2020/0280201 A1 | * | 9/2020 | Helnerus | H02J 7/0042 |
| 2020/0282849 A1 | * | 9/2020 | Niederl | B60L 53/16 |

(Continued)

FOREIGN PATENT DOCUMENTS

| | | |
|---|---|---|
| EP | 2548759 A2 | 1/2013 |
| EP | 3180832 B1 | 9/2020 |

(Continued)

OTHER PUBLICATIONS

Int'l Search Report and Written Opinion Appln No. PCT/US2021/049772 mailed Jan. 3, 2022.

*Primary Examiner* — Ahmed H Omar
(74) *Attorney, Agent, or Firm* — Michael Stanley Tomsa; McAndrews, Held & Malloy, Ltd.

(57) ABSTRACT

Disclosed is an automotive power system configured to facilitate monitoring and charging (and/or discharging) of a vehicle. The vehicle may be a hybrid electric vehicle or an electric vehicle. The automotive power system may further comprise a cable management system. In some examples, the automotive power system may further comprise a reversible dock and/or status indicators on the handle.

20 Claims, 17 Drawing Sheets

(56)　　　　　References Cited

U.S. PATENT DOCUMENTS

| | | | | | |
|---|---|---|---|---|---|
| 2021/0354582 | A1* | 11/2021 | Butler | .................... | G06Q 50/00 |
| 2022/0063432 | A1* | 3/2022 | Mercer | ................... | B60L 53/14 |
| 2023/0089802 | A1* | 3/2023 | Guerra | ..................... | B60L 1/02 |

FOREIGN PATENT DOCUMENTS

| | | | | | |
|---|---|---|---|---|---|
| JP | 2018057082 | * | 4/2018 | ............. | B60L 11/18 |
| WO | 2017156019 | A1 | 9/2017 | | |

* cited by examiner

AUTOMOTIVE BATTERY POWER SYSTEM

CROSS-REFERENCE

The present application claims the benefit under 35 U.S.C. § 119(e) of U.S. Provisional Patent Application Ser. No. 63/126,621, filed Dec. 17, 2020, U.S. Provisional Patent Application Ser. No. 63/184,950, filed May 6, 2021, and U.S. Provisional Patent Application Ser. No. 63/238,668, filed Aug. 30, 2021; each of which is titled "Automotive Battery Power System" and hereby incorporated by reference.

FIELD

The present disclosure relates to an automotive power system. More specifically, the present disclosure relates to systems, methods, and apparatuses for charging (and/or discharging) hybrid electric vehicles and/or electric vehicles.

BACKGROUND

While conventional automobiles that derive motive power from a fuel-driven internal combustion engine still dominate the market, hybrid-electric vehicles (HEV) and electric vehicles (EV) are becoming increasingly popular. For example, as of August 2020, cumulative sales in the United States totaled 1.6 million highway legal plug-in electric cars since 2010, of which, 1 million are all-electric cars. This number is expected to rise exponentially.

A hybrid electric vehicle (HEV) is a type of hybrid vehicle that combines a conventional internal combustion engine system with an electric propulsion system (hybrid vehicle drivetrain). Similarly, an electric car uses an electric propulsion system using energy stored in rechargeable batteries. Unlike a hybrid electric vehicle, an electric car does not include a conventional internal combustion engine system and therefore must be recharged periodically. The presence of the electric powertrain is intended to achieve either better fuel economy than a conventional vehicle or better performance. Hybrid electric vehicles and electric vehicles may take the form of a passenger car, trucks (pickups and tractors), and buses. Compared to internal combustion engine cars, hybrid electric vehicles and electric cars are quieter, have reduced exhaust emissions (or no exhaust emissions), and lower emissions overall.

Charging a hybrid electric vehicle or an electric vehicle can be done via charging stations. While a hybrid electric vehicle can be recharged using its internal combustion engine system, it is sometimes also desirable to charge or "top off" the batteries using a charging station. Some regions offer an electric vehicle network, which is an infrastructure system of charging stations and battery swap station to recharge hybrid electric vehicle and electric vehicles. These electric vehicle networks often provide fast charging functionality. While the availably of electric vehicle charging stations is increasing, electric vehicle charging stations are less common in rural area and some users prefer to charge their hybrid electric vehicles and/or electric vehicles at home.

Therefore, a need exist for an automotive battery power system configured to charge and/or discharge hybrid electric vehicles and/or electric vehicles as disclosed herein.

SUMMARY

The present disclosure relates to an automotive battery power system. More specifically, the present disclosure relates to systems, methods, and apparatuses for charging (and/or discharging) hybrid electric vehicles and/or electric vehicles.

DESCRIPTION OF THE DRAWINGS

These and other advantages of the present invention will be readily understood with reference to the following specifications and attached drawings wherein.

DETAILED DESCRIPTION

Figure 1A:
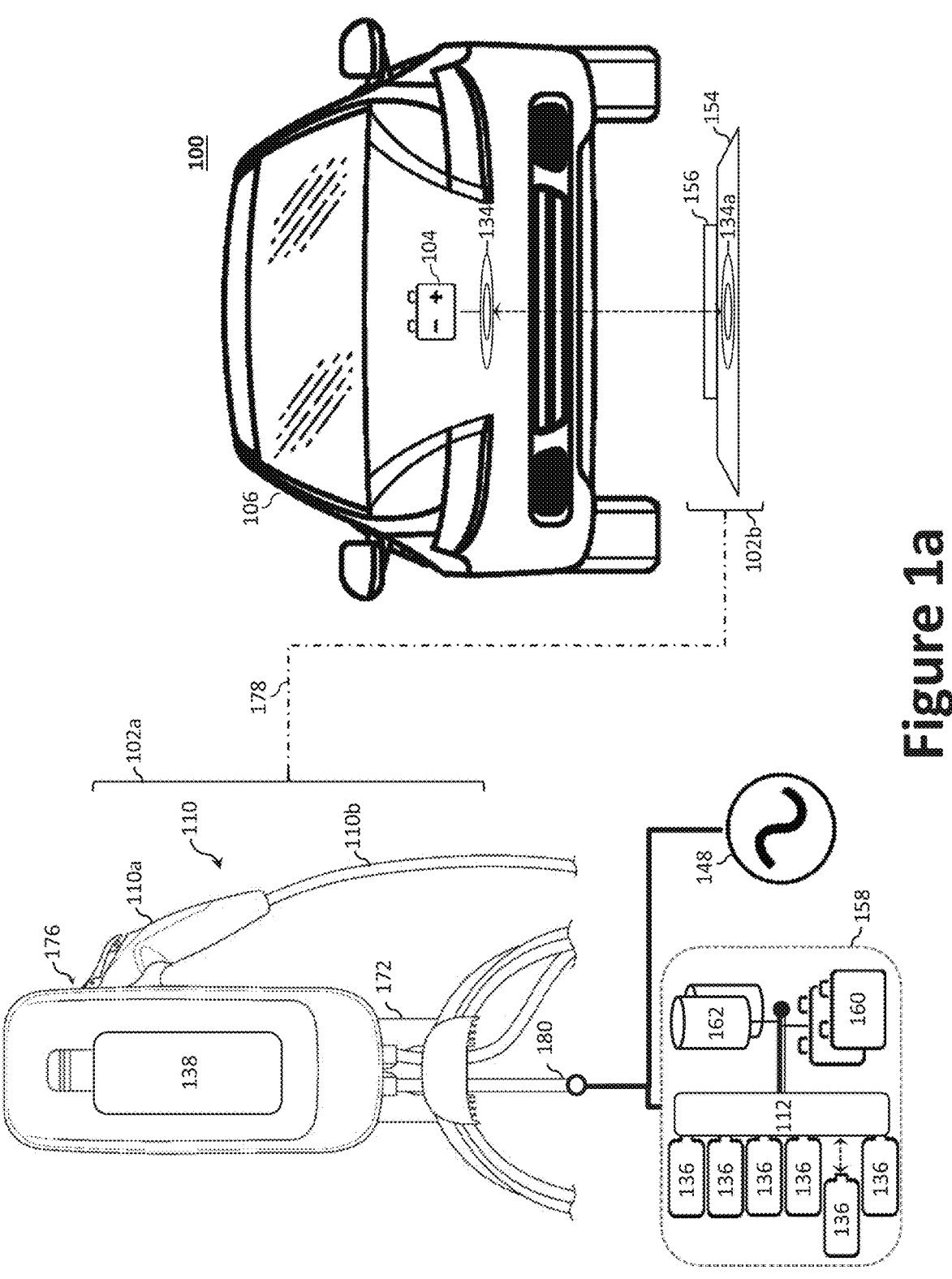
FIG. 1a illustrates an automotive power system configured to facilitate monitoring and charging (and/or discharging) of a vehicle in accordance with aspects of this disclosure.

Preferred embodiments of the present disclosure will be described hereinbelow with reference to the accompanying drawings. In the following description, well-known functions or constructions are not described in detail because they may obscure the disclosure in unnecessary detail. The present disclosure relates to an automotive battery power system. More specifically, the present disclosure relates to systems, methods, and apparatuses for charging (and/or discharging) hybrid electric vehicles and/or electric vehicles.

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "network" as used herein includes both networks and inter-networks of all kinds, including the Internet, and is not limited to any particular network or inter-network.

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

While the availably of public and commercial electric vehicle charging stations is increasing, it is sometimes desirable to charge a vehicle at home (e.g., overnight) rather than stopping to charge at a public location. To that end, disclosed herein is an automotive power system configured to facilitate monitoring and charging (and/or discharging) of a vehicle at home, office, or the like. The automotive power system can be permanently installed (e.g., hardwire and/or secured to a structure), portable, or semi-portable. In some examples, the components of the automotive power system are provided via a plurality of stations. In some examples, certain components of the automotive power system can be modular and/or detachable. To that end, the various components of the automotive power system can be housed in one or more different housings or assemblies to increase ease of use in mobile applications. In some examples, by way of illustration, certain functionality can be provided via an in-line controller of a plug-in charging cord assembly.

In one example, an automotive power system for supplying a charging power to a vehicle using mains power comprises: power electronics circuitry, a charge cable electrically connected with the power electronics circuitry and configured to convey the charging power from the power electronics circuitry to the vehicle via a vehicle connector; and a housing assembly configured to house the power electronics circuitry. The power electronics circuitry comprises a processor configured to control a switch.

In some examples, the housing assembly is composed of a first housing and a second housing, wherein the first housing defines a dock to secure the vehicle connector and the second housing comprises the power electronics circuitry, and wherein the first housing configured to stow the vehicle connector in one of a plurality of configurations. In some examples, the plurality of configurations comprises a left-handed configuration and a right-handed configuration. In some examples, the first housing is configured for installation in either a first position or a second position. In some examples, the first housing is rotated about its vertical axis to alternate between the first position and the second position. In some examples, the second housing comprises an access panel, which can be removed to provide access to the power electronics circuitry. In some examples, the dock comprises a latch or magnet configured to retain the vehicle connector in the dock.

In some examples, the automotive power system further comprises a power bank, wherein the power electronics circuitry is configured to supply the charging power to the vehicle using power stored to the power bank. In some examples, the power bank comprises one or more of a battery bank, a supercapacitor bank, and a removable battery module. The removable battery module can be configured to power an ancillary station, which may be configured to wirelessly charge the vehicle via one or more coils.

In some examples, the automotive power system further comprises a wireless device operatively coupled with said processor to communicatively couple the automotive power system with a portable electronic device. In some examples, the processor is configured to communicate usage data wirelessly to the portable electronic device. In some examples, the usage data includes a total amount of charging power provided to the vehicle during a charging session in watts/kilowatts, and/or as a monetary cost.

In some examples, the processor is configured to receive one or more commands wirelessly from the portable electronic device. In some examples, the one or more commands includes an instruction to fully charge the vehicle by a given date and time. In some examples, the processor is configured to select charging periods in which to supply the charge power as a function of time of day, household power usage, weather, temperature, or utility rates.

In some examples, the vehicle connector comprises a display device to indicate a charging status. The display device may comprise a waveguide material that is annular.

In some examples, the display device comprises a waveguide material positioned on each of a first and a second side of the vehicle connector. In some examples, the vehicle connector comprises a light assembly configured to direct light outward from a distal end of the vehicle connector. In some examples, the light assembly configured to illuminate automatically when the vehicle connector is removed from a dock.

In some examples, the vehicle connector comprises a latching mechanism that is configured to mechanically engage a charge port (1106) of the vehicle. The latching mechanism may comprise an actuator configured to lock and unlock the latching mechanism. In some examples, the processor is configured to control the actuator based on an operator input provided wirelessly via a portable electronic device. In some examples, the processor is configured to control the actuator based on an operator input provided via a keypad positioned on the vehicle connector. In some examples, the operator input includes a login credential, such as a fingerprint or a personal identification number (PIN) or password.

In some examples, the housing assembly is a reel housing assembly or a ground-mounted housing assembly. The ground-mounted housing assembly may comprise a first dock and a second dock, wherein the second dock is positioned within a cavity of the ground-mounted housing assembly. In some examples, the first dock is an inward-facing dock and the second dock is an outward-facing dock. In some examples, the housing assembly is a cart-based housing assembly, which may include a clam-shell case. In some examples, the charge cable is a retractile coil cable. In some examples, the automotive power system further comprises a spool that is removably coupled with the housing assembly via a release button.

Figure 1B:
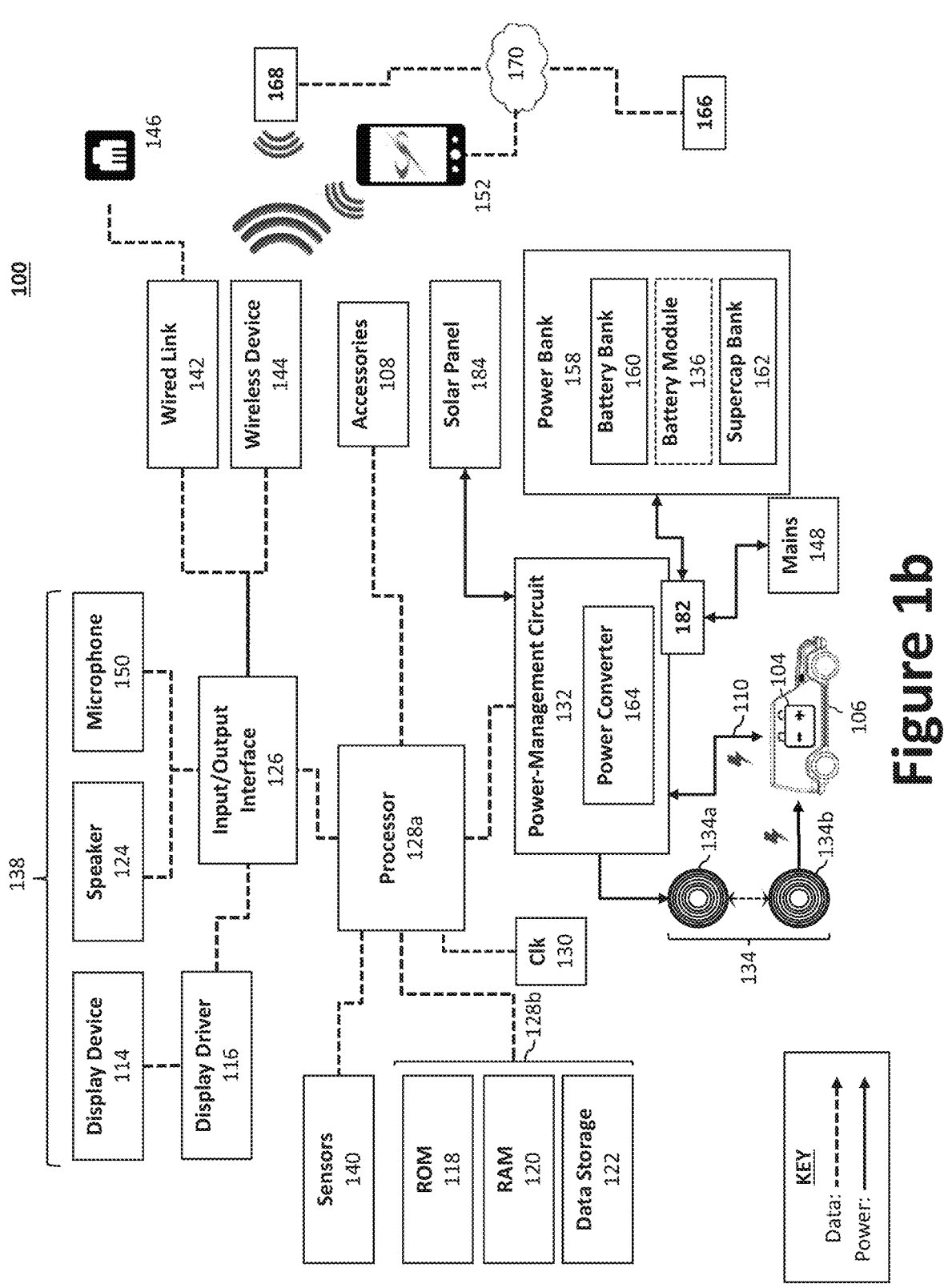
FIG. 1b illustrates a block diagram of the automotive power system in accordance with aspects of this disclosure.
Figure 1C:
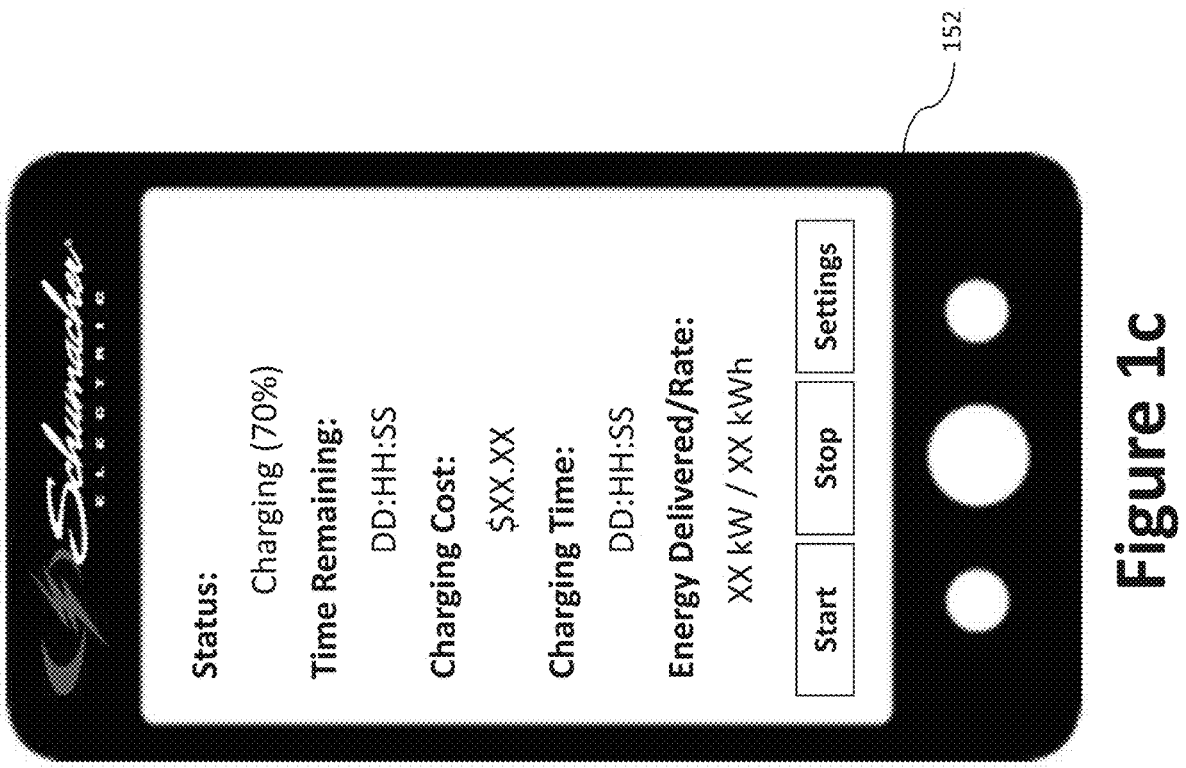
FIG. 1c illustrates a user interface of the automotive power system in accordance with aspects of this disclosure.

FIG. 1a illustrates an automotive power system 100 configured to facilitate monitoring and charging (and/or discharging) of a vehicle 106 (e.g., hybrid electric vehicles and/or electric vehicles) in accordance with aspects of this disclosure, while FIG. 1b is a block diagram of the automotive power system 100. FIG. 1c illustrates an example user interface of a portable electronic device 152 configured to control and/or monitor the automotive power system 100. For purposes of illustration, the various components of FIG. 1b are illustrated as part of a single system; however, components thereof can be distributed across multiple components, housings, assemblies, etc. Therefore, it is contemplated that certain components or functionality can be provided via a charging station while other components or functionality can be provided via an ancillary station. For example, the automotive power system 100 of FIG. 1a includes a charging station 102a (e.g., a first station) and an ancillary station 102b (e.g., a second station). Further, while a single component (e.g., processor 128a, various circuitry, etc.) may be illustrated, the described functionality may be distributed across multiple components.

The automotive power system 100 can be installed in or at, for example, a residence (e.g., a garage) or other location and used to charge and/or discharge an automotive battery 104 of the vehicle 106. In the illustrated example, the charging station 102a can be provided as a wall-mounted or wall-adjacent structure, while the ancillary station 102b can be a compact and/or portable structure that is positioned below the vehicle 106, for example. The charging station 102a comprises a user interface 138, one or more charging cord assemblies 110, and, in some examples, a power bank 158. As will be discussed, the automotive power system 100 may derive power via an electrical cable 180 from, for example, mains power 148 (e.g., power from an electric grid, such as a single-phase 120 or 240 volt alternating current (VAC) supply or a three-phase supply) via a switch 182 (e.g., a mechanical or solid state switch), the power bank 158, or the like. The charging station 102a and the ancillary station 102b can be operatively coupled to one another via a link 178. The link 178 includes one or more wireless transmitters and/or one or more wires (e.g., a cable) to convey data and/or power. For example, the charging station 102a and the ancillary station 102b may communicate data wirelessly via one or more transceivers, while power to operate the ancillary station 102b can be derived via the one or more wires, an onboard power system 156, or a separate connection to mains power 148.

The charging station 102a can be used to charge a vehicle 106 using power from the mains power 148 or power stored to the power bank 158. The automotive power system 100 can be removably coupled with a vehicle 106 (e.g., via its charge port) at the charging station 102a via one or more charging cord assemblies 110. As illustrated, the charging cord assembly 110 generally comprises a vehicle connector 110a and a charge cable 110b. The charging station 102a may include a dock 176 sized and shaped to secure the vehicle connector 110a when stowed or when otherwise not in use.

Figures 8A, 8B:
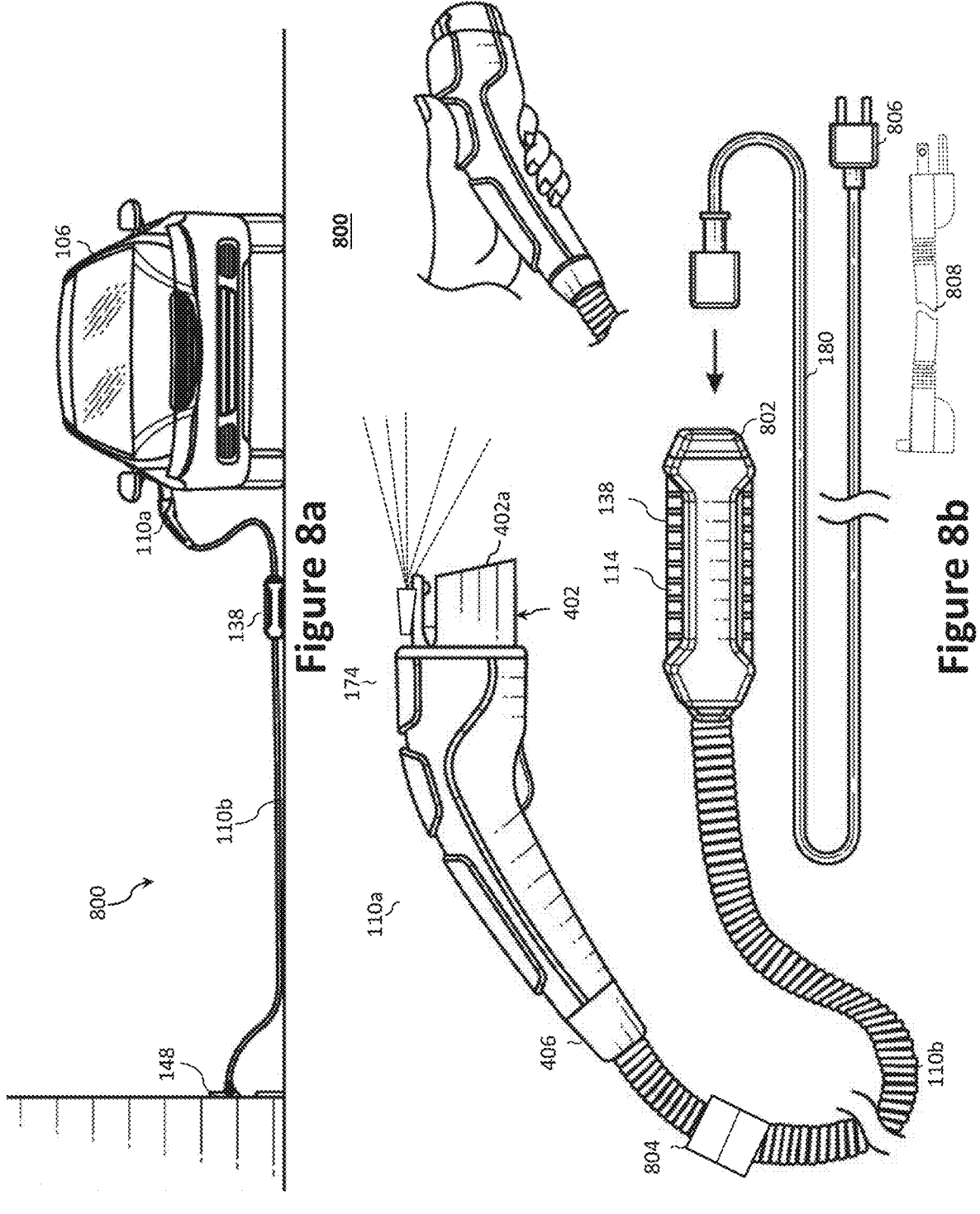
FIGS. 8a and 8b illustrate an example of the automotive power system embodied as a plug-in charging cord assembly in accordance with an aspect of this disclosure.

The length of the charge cable 110b can be varied to accommodate the installation location. For example, in a 2-car garage, the charge cable 110b may be 25 ft to enable use of a single charging cord assembly 110 in each of the parking stalls. As illustrated in FIG. 1a, a spool 172 can be used to provide storage/stowage of the charge cable 110b when not in use. For example, the charge cable 110b may be looped and hung from the spool 172 or otherwise wrapped around the spool 172. As illustrated, the dock 176 may be positioned on a side of the charging station 102a. In other examples, the dock 176 may be integrated with another portion of the charging station 102a, such as the spool 172. In some examples, the charge cable 110b may be fabricated as a retractile coil cable (e.g., coiled similarly to a spring, an example of which is illustrated in FIG. 8b). In some examples, the charge cable 110b ruggedized to mitigate damage to the internal conductors (e.g., the charge cable 110b include a durable outer sheath, such as one made from nylon or another material).

Additionally or alternatively, the charge cable 110b can be heated or cooled via one or more fluid conduits or electrical conductors to maintain a desired cord temperature. For example, the charge cable 110b may become less flexible or pliable in colder weather due to hardening of the insulation materials, thereby making it more difficult to handle. Therefore, the charge cable 110b may be heated cord whereby a preheat power can be run through cord to resistively heat charge cable 110b in cold weather, for example. The charge cable 110b may also provide sensing capabilities. For example, a sensor can be provided at the vehicle connector 110a to detect a current drop across the charge cable 110b, which could indicated damage to or overheating of the charge cable 110b. In this example, the automotive power system 100 may measure power at the vehicle connector 110a and compare it the power output from the vehicle connector 110a, whereby the difference (drop) can be used to determine the current leakage/loss. In another example, temperature sensors can be provided in the charge cable 110b or at the vehicle connector 110a to monitor a temperature thereof.

The charging station 102a receives power from the mains power 148 (and/or the power bank 158) via the electrical cable 180 and outputs a charging power to the vehicle 106 based on, for example, one or more pilot signals from the vehicle 106. The voltage and current of the charging power may be dictated by the mains power 148. For example, if the automotive power system 100 is connected to mains power 148 with 120 volt and having a 15 amp breaker (e.g., a level 1 charger), the charging power would be 120 volts and limited to 15 amps, whereas the charging power would be 240 volts and limited to 20 amps when connected to mains power 148 with 240 volt and having a 20 amp breaker. While the maximum current would be limited by the breaker, the actual current delivered is dictated by the vehicle 106 (e.g., based on its state of charge). In operation, for example, the vehicle 106 communicates a control pilot signal and/or a proximity pilot signal to the processor 128a of the charging station 102a indicating the power requirements and connection status of the vehicle 106. For example, the vehicle 106 may indicate via a pilot signal that the charging power should be decreased (or discontinued) when the automotive battery 104 is nearly charged (or charged), increased when the automotive battery 104 is discharged, or discontinued when the charging cord assembly 110 is disconnected (or partially disconnected) from the vehicle 106.

The automotive power system 100 may provide, for example, Level 1 charging when the mains power 148 is 120 VAC or Level 2 charging when the mains power 148 is 240 VAC. Level 2 offers faster charging speed compared to Level 1. In another example, the automotive power system 100 may provide Level 3 charging (DC fast charging). Level 3 charging charges the vehicle 106 using 480 volts direct current (VDC). For example, power from the mains power 148 or stored to the power bank 158 can be stepped up using a converter (e.g., a boost converter) and, where applicable, rectified to provide the 480 VDC.

The power bank 158 may comprise a battery bank 160, a supercapacitor bank 162, and one or more removable battery packs 136. The one or more removable battery packs 136 are coupled to the power bank 158 via an interface 112. The power bank 158, or portions thereof, may be integrated with the charging station 102a (e.g., share a common housing, chassis, etc.) or remotely situated and connected to the charging station 102a via one or more cables (e.g., the electrical cable 180). The power bank 158 can be used as backup power when the mains power 148 is unavailable, when additional power is needed (e.g., to supplement the mains power 148), or when it is otherwise desirable to rely on the power bank 158 (e.g., when the mains power 148 rates are too high/expensive).

In one example, the power bank 158 can be charged using mains power 148 and stepped up to provide Level 3 charging. In another example, such as when mains power is unavailable, the automotive power system 100 may provide a charging power to the vehicle 106 from the power bank 158 via a power converter 164, such as a DC-DC converter. To charge the power bank 158 (or components thereof) and otherwise power the automotive power system 100, the automotive power system 100 may receive external power from mains power 148. As noted above, the mains power 148 may be an AC power supply, but a DC power supply can be used where available. In addition to charging the vehicle 106, power from the power bank 158 or the power-management circuit 132 and allocated to the other components of the automotive power system 100, including, inter alia, the processor 128a, input/output interface(s) 126, etc.

The battery bank 160 comprises a plurality of battery cells that are electrically coupled in parallel, series, or a combination thereof to provide a desired direct current (DC)

voltage, where switches are used to selectively charge and/or discharge power thereto or therefrom. For example, battery cells may be connected in series to achieve a higher nominal voltage or in parallel to achieve a higher storage capacity. The battery cells may employ, for example, lithium battery chemistries. Example lithium battery chemistries include lithium iron phosphate ($LiFePO_4$), lithium polymer (Li-poly), lithium-cobalt oxide ($LiCoO_2$), lithium-titanate, lithium-nickel manganese cobalt oxide ($LiNiMnCoO_2$ or NMC), lithium iron magnesium phosphate ($LiFeMgPO_4$), lithium-manganese oxide ($LiMnO_2$), lithium ion manganese oxide ($LiMn_2O_4$, $Li_2MnO_3$, or LMO), etc. Other metal battery chemistries are possible, for example, aluminum-ion batteries. In some examples, it may be desirable to provide a portable source of power to charge and/or otherwise power another device. To that end, the power bank 158 may provide one or more battery cells as a removable battery module 136. The removable battery module 136 can be coupled to the power bank 158 via, for example, an interface 112 (e.g., a charging dock).

The interface 112 may include electrical contacts (e.g., tabs, plugs, plates, pogo pins, etc.) to transfer power between the removable battery module 136 and the power-management circuit 132. The interface 112 may further include mechanical attachments to secure the removable battery module 136 (e.g., via snaps, clips, tracks, etc.). For example, the removable battery module 136 may slide into and lock to the interface 112. The interface 112 may also be configured to transfer data between the power-management circuit 132 and the removable battery module 136 via the electrical contacts. For example, the removable battery module 136 may employ software that controls charging and discharging of the removable battery module 136. In certain aspects, the charging station 102a may employ authentication software to authenticate the removable battery module 136.

The charging station 102a can be configured to charge the removable battery module 136, which may be detached from the charging station 102a and used to power a separate device, such as the ancillary station 102b. Once depleted, the removable battery module 136 can be returned to the charging station 102a and coupled to the interface 112 to be recharged. The removable battery module 136 can be charged via the power-management circuit 132 (e.g., when electrically coupled to the interface 112). The power-management circuit 132 may comprise a power converter 164 and/or one or more switches (e.g., switch 182) to control power transfer with the mains power 148. In certain aspects, the power converter 164 can be coupled to the mains power 148 and used to charge the power bank 158. In some examples, the AC-to-DC converter is used to charge the power bank 158 (e.g., battery bank 160, removable battery module 136, and/or supercapacitor bank 162), and or automotive battery 104 directly. The power converter 164 may employ one or more of a buck converter, a boost converter, a buck boost converter, and/or a single-ended primary-inductor converter (SEPIC) circuit.

The supercapacitor bank 162 can be used to supply a large burst of power. A supercapacitor, also called an ultracapacitor, is a high-capacity capacitor with a capacitance value that is much higher than other capacitors (e.g., 10 to 100 times more energy per unit volume or mass than electrolytic capacitors). The supercapacitor bank 162 may be composed of a plurality of supercapacitors electrically coupled in parallel, series, or a combination thereof, where switches are used to selectively charge and/or discharge power thereto or therefrom. The supercapacitor bank 162 may be reconfigurable according to different vehicle battery voltages. Supercapacitors are useful in that, unlike batteries, they do not necessarily suffer from ageing and temperature problems. In general, a supercapacitor can hold a very high charge that can be released relatively quickly. In certain aspects, power from the supercapacitor bank 162 can be used to power the automotive power system 100 to conserve power in the battery bank 160 and/or the removable battery module 136. For example, in sleep mode, the supercapacitor bank 162 can be used to power the automotive power system 100.

When the mains power 148 is unavailable (e.g., disconnected, out of service, when a circuit breaker is blown, the automotive power system 100 is otherwise disconnected, etc.), the automotive power system 100 may draw the power needed to operate the components of the automotive power system 100 from the automotive battery 104 and/or from the power bank 158, thereby enabling the user to determine the status of the automotive power system 100 (and state of charge, or other parameters, of the automotive battery 104) when the mains power 148 is unavailable. To that end, the automotive power system 100 may report a power supply failure (e.g., as an alert) to one or more portable electronic devices 152 (e.g., phones, tablet computers, portable computers, or other handheld terminals) within a battery monitoring network via a communication network 170.

As noted above, the power bank 158 can be used as a source of power when mains power 148 is unavailable; however, the automotive battery 104 can be used for a similar purpose. Hybrid electric vehicles and/or electric vehicles typically comprise a large capacity battery bank on-board the vehicle, which can also be used as a source of power when mains power 148 is unavailable. For example, in the event of a power outage, the automotive power system 100 may draw current from the power bank 158 (e.g., via the electrical cable 180) and/or the automotive battery 104 (e.g., via the charging cord assembly 110) to power a residence or other device. The power can be converted to an AC household power (e.g., 120 VAC or 240 VAC) via the power converter 164, which can include one or more DC-AC converters. Therefore, the automotive power system 100 obviates the need for a backup generator, which are noisy and produce exhaust fumes. As an example, automotive power system 100 may use power from the power bank 158 and/or the automotive battery 104 as a backup power supply for a garage door opener or another household device. In certain aspects, the automotive power system 100 may draw power from the vehicle 106 to charge the power bank 158 from the vehicle 106 via the one or more charging cord assemblies 110.

In lieu of, or in addition to, the charging cord assembly 110, the automotive power system 100 may facilitate wireless charging through, for example, inductive or resonant coupling using coils 134 (e.g., coils 134a, 134b). The two coils 134a, 134b, when in proximity, combine to form an electrical transformer. Through electric coupling, electric power can be wirelessly transmitted between the automotive power system 100 and the vehicle 106. Therefore, the automotive power system 100 may be configured to both discharge and be charged using the one or more coils 134a, 134b (i.e., bi-directionally) depending on, for example, a user setting. Greater distances between transmitter and receiver coils can be achieved when the inductive charging system uses resonant inductive coupling. The coils 134a, 134b may be fabricated using a variety of materials, such as silver plated copper (or aluminum) to minimize weight and decrease resistance resulting from the skin effect.

As illustrated, one or more coils 134a may be positioned in or on the ancillary station 102b and configured to function as a transmitter to provide wireless power to the vehicle 106 or as a receiver to receive wireless power from the vehicle 106. The one or more coils 134a may be provided via a charge mat 154, which may be rolled or folded for easy stowage. The ancillary station 102b may be wireless to increase portability and to avoid obstruction with the vehicle 106 when parking, for example, thereby mitigating risk of damage by the vehicle 106. To that end, the ancillary station 102b may derive its power via an onboard power system 156 (e.g., a power source and associated control circuitry). In some examples, the onboard power system 156 may be coupled with the removable battery module 136, which would serve as a power source. For example, an operator may remove a fully charged removable battery module 136 from the interface 112 of the charging station 102a and use the removable battery module 136 to power the ancillary station 102b via the power system 156 during one or more vehicle charging sessions. Once the removable battery module 136 is discharged or depleted, the removable battery module 136 may be returned to the charging station 102a and replaced with a different removable battery module 136 that is charged.

The ancillary station 102b is, in some examples, portable and can be used to charge the vehicle 106 outside the home. For example, the operator may charge the vehicle 106 while it is parked at a remote location without an electric vehicle charging station by simply placing the ancillary station 102b under the vehicle 106 to charge the vehicle 106 wirelessly. Because wireless charging introduces an amount of power efficiency losses through the wireless coupling, in some aspects, the ancillary station 102b may instead be coupled to the vehicle 106 via one or more cables. In this example, the ancillary station 102b would effectively serve as an electric vehicle jump pack or back up battery whereby the vehicle 106 would draw a charging power from the power supply of the ancillary station 102b. In this example, the ancillary station 102b may include a vehicle connector to releasable coupled with a charge port of the vehicle 106. In another example, the power system 156 may be coupled with one or more solar panels 184 to provide a charging power to the ancillary station 102b and/or the vehicle 106. For example, a solar panel may be unrolled and placed on the roof of the vehicle and connected to the ancillary station 102b via cable.

Referring to FIG. 1b, the automotive power system 100 may comprise one or more processors 128a (e.g., a microprocessor, a central processing unit (CPU), etc.) to control the various operations of the automotive power system 100 (e.g., to monitor and/or selectively charge or boost external devices). The one or more processors 128a are operatively coupled to one or more memory devices 128b, such as a read-only memory (ROM) 118 for receiving one or more instruction sets, a random access memory (RAM) 120 having a plurality of buffers for temporarily storing and retrieving information, and to an internal data storage device 122 (e.g., a hard drive, such a solid state drive, or other non-volatile data storage device, such as flash memory). A clock 130 is also coupled to the processor 128a for providing clock or timing signals or pulses thereto. Those skilled in the art will understand that the automotive power system 100 includes one or more bus structures for interconnecting its various components. In certain aspects, the automotive power system 100 may employ one or more communication protocols and interfaces, such as I²C, Serial Peripheral Interface (SPI), etc.

The one or more processors 128a can be used to facility one or more smart charging schemes where the processor 128a is configured to select charging periods in which to supply the charge power as a function of, inter alia, time of day, household power usage, weather, temperature, or utility rates. For example, as will be described below, the automotive power system 100 may employ a scheduled charging session that provides power to the vehicle 106 as a function of at least one of time of day, household power usage, weather, temperature, utility rates, etc. In one example, an operator may set the automotive power system 100 to ensure that the vehicle 106 is fully charged by a given date and time. The automotive power system 100 may then, for example, determine the state of charge of the automotive battery 104, determine the amount of time needed to fully charge the vehicle 106, and perform one or more charging sessions based on time of day, household power usage, temperature, utility rates, etc. to ensure the vehicle 106 is fully charged by the set date and time. For example, the operator may set the automotive power system 100 to ensure the vehicle 106 is fully charged each day or weekday by 8 am. If the automotive power system 100 determines, via one or more processors 128a, that it will take 5 hours to charge the vehicle 106, the automotive power system 100 may automatically start charging the vehicle 106 at 3 am. If electricity rates, for example, are lower between midnight and 5 am, the automotive power system 100 may automatically start charging the vehicle 106 at 12 am. The one or more processors 128a may selectively start and stop charging by closing or opening the switches 182, respectively.

The automotive power system 100 may employ different charging protocols depending on the technical specifications or ratings of the automotive battery 104 and/or vehicle 106. The technical specifications or ratings can be inputted to the automotive power system 100 via the user interface 138 or detected automatically. In one example, the one or more processors 128a may receive data from the automotive battery 104 and/or vehicle 106 reflecting its technical specifications or ratings (e.g., via wireless device 144, charging cord assembly 110, or one or more coils 134a). In another example, the one or more processors 128a can be configured to determine the size of the automotive battery 104 over time to learn and more accurately predated when the automotive battery 104 will be fully charged. For example, the one or more processors 128a may monitor how fast the automotive battery 104 is charging or degrading (e.g., in terms of ampere hours (Ah), kilowatt-hour (kWh), etc.).

The one or more processors 128a can be configured to operate in a low power mode (e.g., a sleep mode). For example, when in a low power mode, the one or more processors 128a can be configured to operate the automotive power system 100 in a low power mode where it is responsive to user input, but non-essential components are disabled to conserve power until the automotive power system 100 is reactivated by a user input. Examples of non-essential components include, for example, display device 114, display driver 116, communication (e.g., via wired link 142 and wireless device 144), accessories 108, speakers, etc. While a single processor 128a is illustrated, a plurality of processors 128a can be used to operate the automotive power system 100; whether in the same housing or separate housings. Accordingly, serial communication can be employed to communicate information and data between multiple processors 128a that can be used.

The automotive power system 100 may further include an input/output interface 126 that interfaces the processor 128a with one or more peripheral and/or communicative devices, such as a user interface 138, a wired link 142, a wireless device 144, a microphone 150, and a speaker 124, which may be used to signal an alert (e.g., charge complete, error, etc.) or other status information. As illustrated, the processor 128a can be operatively coupled to a display device 114 via a display driver 116.

The user interface 138 can be used by the user to set, program, and otherwise control operation of the automotive power system 100. Example user interface 138 devices may include, for example, physical buttons, physical switches, a digitizer (whether a touch pad, or transparent layer overlaying the display device 114), voice command (e.g., via the microphone 150 and speaker 124), and other input devices. For instance, using the digitizer, a user may control or interact with the automotive power system 100 by writing or tapping on the display device 114 using, a pen, stylus, or finger. In certain aspects, as will be described below, the user interface 138, or a portion thereof, can be remotely situated and coupled to the automotive power system 100 over a communication network 170 (e.g., as part of a portable electronic device 152, such as a mobile application).

The display device 114 may comprise, or otherwise employ, one or more light emitting diodes (LEDs), a liquid crystal display (LCD) screen, and/or an organic light-emitting diode (OLED or organic LED) screen. The LCD/OLED screen may be an alphanumeric segmented display, or a matrix display, such as those used on portable electronic devices. In certain embodiments, the LCD/OLED screen may further provide touch screen functionality to facilitate user input device via a thin layer of sensing circuitry present either beneath the visible portion of a surface of the display device 114, or as part of a thin, clear membrane overlying the display device 114 that is sensitive to the position of a pen or finger on its surface. In certain aspects, the automotive power system 100 may employ multiple display devices 114. For example, a first display device 114 may be provided on the charging station 102a, while a second display device 114 may be provided on the ancillary station 102b. The first and second display devices 114 may provide redundant information and/or function-specific information. For example, when the ancillary station 102b houses components of the automotive power system 100 that are specific to wirelessly charging the vehicle 106, the second display device may be specific to the wirelessly charging function.

In operation, the display driver 116 may receive display data from the processor 128a via input/output interface 126 and display the display data via the display device 114. For example, interactive display device 114 may be provided to provide the user with status information and/or operator input capability (e.g., via a touch screen or voice commands using, for example, wave files). Reminders, or other information (e.g., status information), may be displayed to the user, via the display device 114, as a scrolling message or menu structure (e.g., a graphical user interface (GUI)).

In some examples, the user interface 138 may provide a display device 114 in the form of a light or other indicator that changes color to clearly convey the charge status to the user. In some examples, a display device 114 may be provided on each of the charging station 102a and the vehicle connector 110a. For example, a portion of the charging station 102a and/or the vehicle connector 110a may be fabricated with a waveguide (e.g., a transparent or translucent material) that can be illuminated by a light (e.g., an LED) to serve as the display device 114. A waveguide is sometimes referred to as a light pipe. In some examples, the dock 176 (or portion thereof, such as the bezel) to which the vehicle connector 110a attaches when stowed may be fabricated with the waveguide such that the dock 176 functions as a display device 114. In operation, the display device 114 can be illuminated in green when a charge is compete, in yellow (or amber) when charging, or in red when an error or fault is detected. In another example, the automotive power system 100 may additionally or alternatively include a start/stop button on the charging station 102*a* that illuminates to quickly convey the charge status to the user. In this example, the start/stop button may be pressed once to start a charging session, in which case the 100 automatically charges the 106 in accordance with one or more predetermined charging protocols based on one or more sensor readings (e.g., temperature, state of charge, battery condition, battery type, etc.). Pressing the start/stop button a second time can end the charging session. Like the above-describe illuminated dock 176, the start/stop button (or portion thereof, such as the bezel) may be fabricated from a transparent or translucent material that can be illuminated by a light to convey a status.

With regard to the internal data storage device 122, example flash memory devices include, for example, memory cards, such as RS-MMC, miniSD, microSD, etc. The internal data storage device 122 can function as an external hard drive or flash drive, thereby enabling the user to store digital files to the automotive power system 100. In instances where the internal data storage device 122 is removable, as is the case with memory cards, the user can interchange, upgrade, or remove the memory card (e.g., if the automotive power system 100 becomes defective) to avoid data loss. For example, the automotive power system 100 may collect and store to the internal data storage device 122 charging history, diagnostics information, etc. The display device 114 can be used to display, for example, the contents of the internal data storage device 122, the remaining storage capacity (e.g., as a percentage or in terms of available bytes), and, in certain aspects, the digital files themselves (e.g., photos can be displayed, files accessed, etc.).

When a vehicle 106 is connected to the automotive power system 100 (e.g., via one or more charging cord assemblies 110 or one or more coils 134*a*), the display device 114 may display the voltage, state of charge, state of heath, and/or other information pertaining to the automotive battery 104 and/or the vehicle 106. The display device 114 may also indicate the state of charge of the power bank 158 in terms of percent of charge of the battery bank 160. During user inactivity, such as when charging the automotive battery 104, the battery bank 160, or the removable battery module 136, the display device 114 may enter a sleep mode and will not display any messages until activity is detected (e.g., when devices are connected/disconnected from the automotive power system 100 or the user interface 138 is actuated). A sleep mode can be trigged when there is no user interaction for a period of time (e.g., no commands or button presses for at least 30 minutes).

The wireless device 144 can be configured to manage communication and/or transmission of signals or data between the processor 128*a* and another device (e.g., the portable electronic device 152 via a communication network 170 and a wireless access point 168 or directly with a portable electronic device 152) by way of a wireless transceiver. In operation, a user may control the automotive power system 100, monitor live charging status updates, charging conditions, historic data, remotely update software and firmware, and stay connected with the automotive power system 100 news and updates from the manufacturer via the communication network 170 and a remote server 166. In some examples, the remote server 166 may be a third party server.

Using a wireless device 144, a user may start and/or stop the charge cycle of the automotive power system 100 or otherwise change the settings. The wireless device 144 can be a wireless transceiver configured to communicate via one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. For example, wireless connectivity (e.g., RF 900 MHz or Wi-Fi) can be integrated with the automotive power system 100 to provide remote monitoring and control of the automotive power system 100 via one or more portable electronic devices 152. In some examples, such as where bandwidth is limited, a publish-subscribe network protocol can be used to transport messages between the automotive power system 100 and another device, such as the message queuing telemetry transport (MQTT). The MQTT can run over TCP/IP; however, any network protocol that provides ordered, lossless, bi-directional connections can support MQTT. In certain aspects, an internal cellular modem can be implemented that utilizes standards-based wireless technologies, such as 2G, 3G, 4G, Code Division Multiple Access (CDMA), and Global System for Mobile Communications (GSM), to provide wireless data communication over worldwide cellular networks. An advantage of an internal cellular modem is that there is no reliance on a local network (e.g., wireless router, modem, etc.) of the user, thereby enabling communication between the automotive power system 100 and communication network 170, even in the event of a total power failure in at the location of user. Therefore, one or more routers (e.g., Wi-Fi routers, cellular towers, etc.) can be used to connect the automotive power system 100 to the communication network 170.

A wired link 142 may also be provided to manage communication and/or transmission of signals or data between the processor 128*a* and another device via, for example, a data port 146 (e.g., RS-232, USB, and/or Ethernet ports).

The automotive power system 100 may include sensors 140 (e.g., a temperature sensor, humidity sensor, voltage sensor, current sensor, etc.), configured to monitor itself or other appliances or devices, either directly (e.g., using sensors 140) or wirelessly (e.g., using Wi-Fi). The processor 128*a* can be configured to monitor, via one or more sensors 140 (whether local or remotely located), a temperature of the battery bank 160, the removable battery module 136, or the automotive battery 104. Another temperature sensor can be provided to measure the temperature of the battery bank 160, the automotive battery 104, the removable battery module 136, the supercapacitor bank 162, or another energy storage device being charged. If the measured temperature deviates from an operating range (i.e., a range in which the measured value is acceptable), the charging operation can be prohibited. In some examples, the charge protocol can be automatically selected or adjusted by the automotive power system 100 based on the environment (e.g., the temperature, humidity, etc.), the automotive battery 104 (e.g., the battery type/chemistry, battery nominal voltage, temperature, state of charge, state of heath, etc.), etc.

FIG. 1*c* illustrates an example graphical user interface provided via a portable electronic device 152. In operation, the user can monitor and control operation of the automotive power system 100, the automotive battery 104, and/or the vehicle 106. The graphical user interface may display one or more operating parameters (e.g., usage data) of the vehicle 106 and/or automotive power system 100. Example operating parameters includes voltage of the automotive battery 104, voltage being supplied to the automotive battery 104, current being supplied to the automotive battery 104, whether the automotive battery 104 is connected, percent charge of the automotive battery 104 (e.g., an icon and/or textual representation), amount of energy delivered to the vehicle 106 (e.g., total amount in kilowatts (kW) or the rate in kilowatt-hours (kWh)), state of heath (SoH) of the automotive battery 104, charge state/status, charge time (e.g., elapsed time in minutes and/or remaining time), status of mains power 148 (e.g., available or not), status of power bank 158 (e.g., voltage, charge level, etc.), monetary cost (e.g., the charging cost to charge the vehicle at the current energy rates), faults/errors of the automotive power system 100 or the vehicle 106, state of heath firmware version, and/or wireless signal strength (e.g., Wi-Fi or cellular signal strength). The monetary cost can be calculated or predicted in real time based on information (e.g., a data feed) received from the user or utility company via, for example, wired link 142 or wireless device 144. The user may remotely control the automotive power system 100 via user commands at the portable electronic device 152. For example, the user commands to start/stop the charge, restart or reset the automotive power system 100 (or portion thereof), set the type of automotive battery 104 or vehicle 106, remotely test the automotive battery 104, update the firmware of the automotive power system 100, etc.

Figures 2A, 2B:
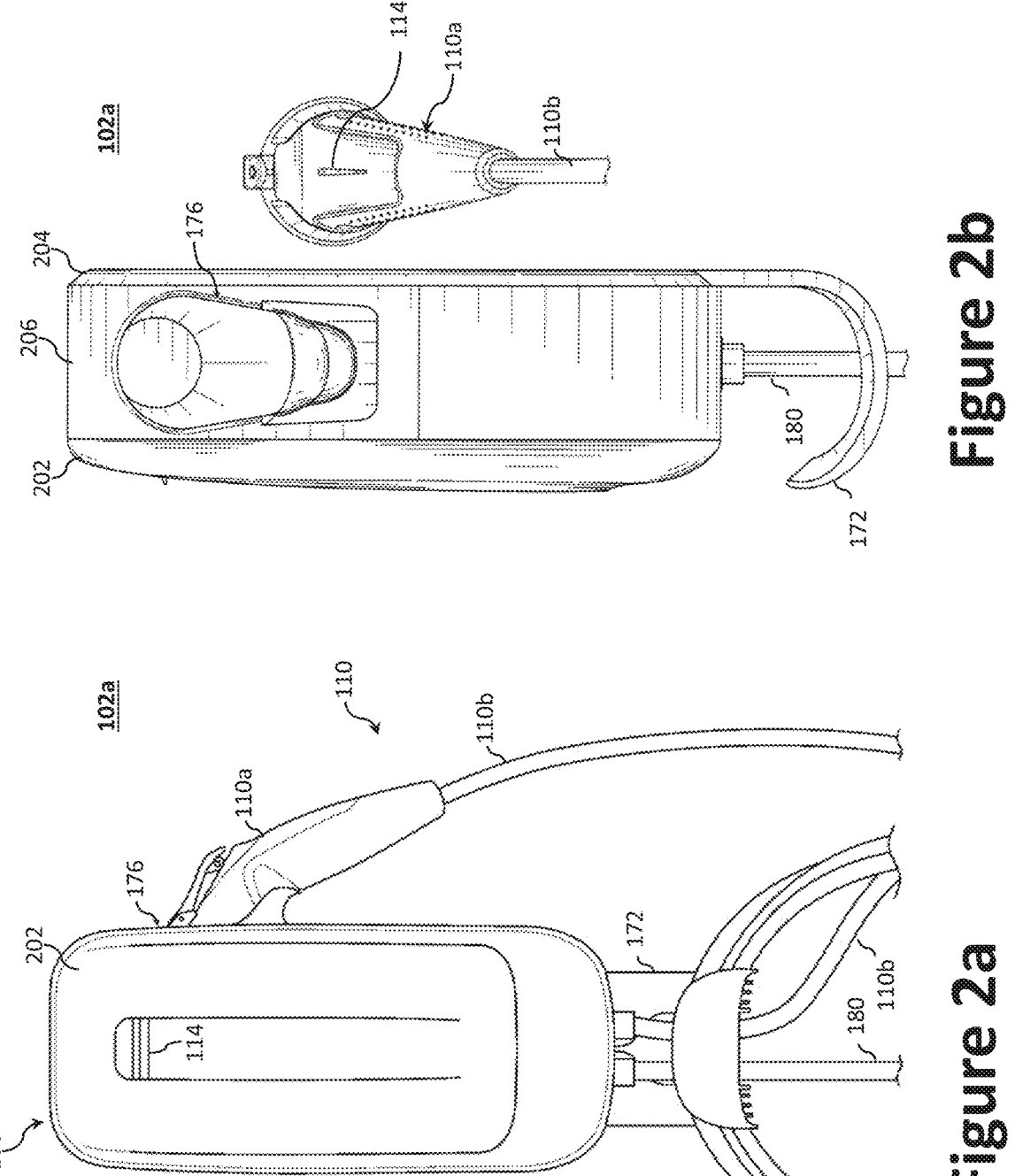
FIGS. 2a and 2b illustrate, respectively, front and side views of a charging station in accordance with aspects of this disclosure.
Figure 2C:
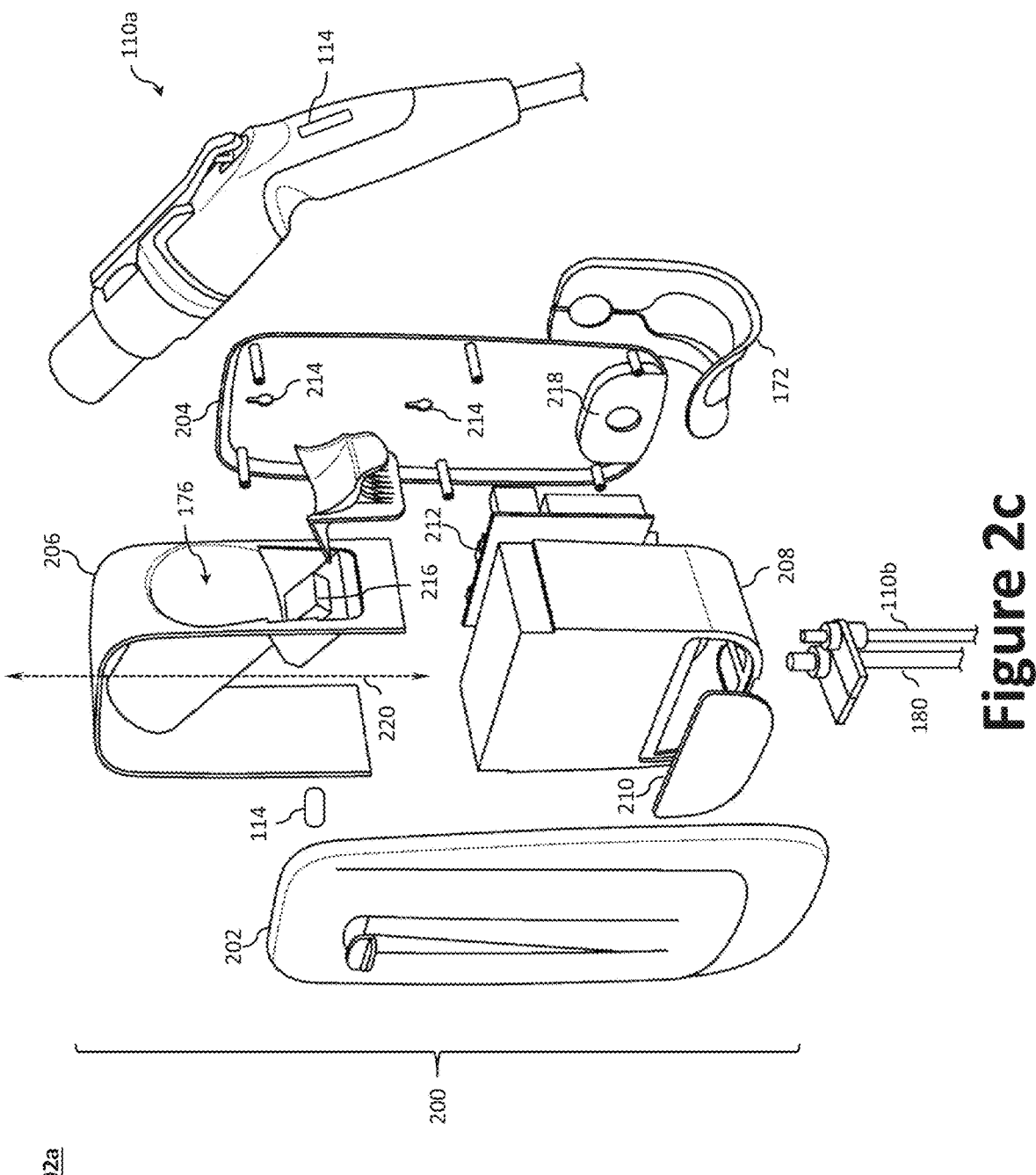
FIG. 2c illustrates a perspective assembly view of the charging station of FIGS. 2a and 2b.

FIGS. 2a and 2b illustrate, respectively, front and side views of an example charging station 102a configured to be wall-mounted, while FIG. 2c illustrate a perspective assembly view thereof. In the illustrated example, each of the charging station 102a and the vehicle connector 110a are fabricated with a waveguide that is illuminated by a light (e.g., an LED or other light source) to serve as the display device 114. In this example, the charging station 102a is controlled wirelessly (e.g., via portable electronic device 152), thereby providing a streamlined appearance by obviating the need for user controls on the housing assembly 200 itself.

As best illustrated in FIG. 2c, the housing assembly 200 generally comprises a front panel 202, a rear panel 204, a first housing 206, and a second housing 208. The front panel 202 serves as a cover and includes, for example, the display device 114. The charging station 102a is attached to the wall via the rear panel 204. To that end, the rear panel 204 defined one or more attachment points 214 (e.g., mounting holes to receive a bolt or screw). The housing assembly 200 is configured to house the power electronics circuitry 212 and/or secure the vehicle connector 110a. In the illustrated example, the first housing 206, which is illustrated as an upper housing, defines a dock 176 and may include a latch or magnet 216 to help retain the vehicle connector 110a in the dock 176. The second housing 208, which is illustrated as a lower housing, defines an opening to house the various power electronics circuitry 212 configured to supply and/or otherwise control power flow between the mains power 148 (or power bank 158, as the case may be) and vehicle connector 110a. The power electronics circuitry 212 includes, for example, a processor 128a, memory devices 128b, power-management circuit 132, wireless device 144, switches 182, etc. The power electronics circuitry 212 can be provided via one or more circuit boards. The power electronics circuitry 212 are coupled to the electrical cable 180 and charge cable 110b. An access panel 210 is provided to enable the user to access the one or more circuit boards of the power electronics circuitry 212 within the second hous-ing 208. For example, to connect/disconnect the electrical cable 180 and charge cable 110b during installation. As illustrated, the spool 172 is removable coupled to the rear panel 204 to enable the user to remove or replace the spool 172 as desired by engaging a release button 218. In some examples, as will be discussed, the first housing 206 is configurable, reversible, or otherwise interchangeable relative to the remainder of the housing assembly 200.

Figures 3A, 3B:
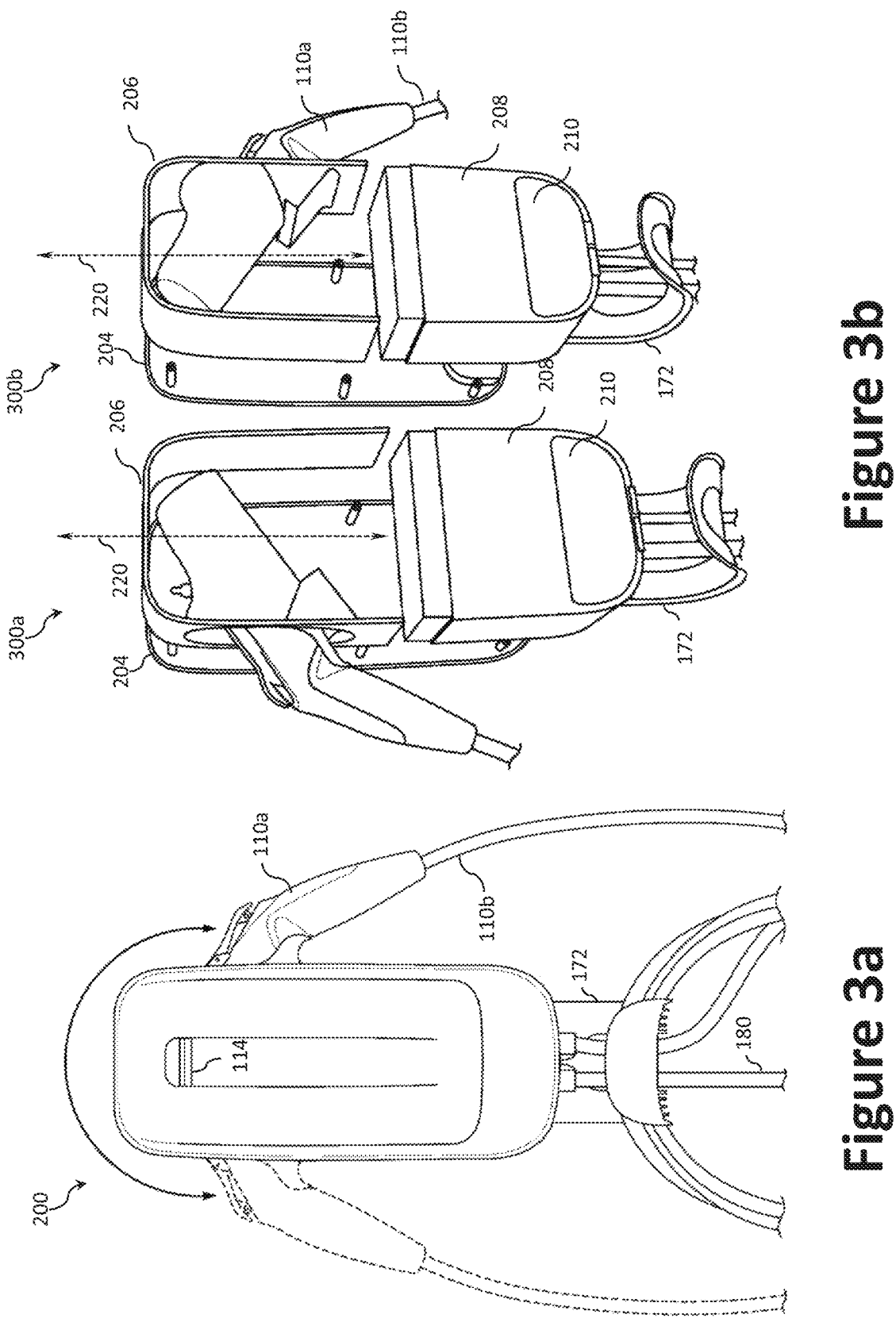
FIG. 3a illustrates an example charging station with a housing assembly having an reversible dock.
FIG. 3b illustrates a set of side-by-side charging stations with the reversible docks configured in a left-handed configuration and a right-handed configuration.

FIG. 3a illustrates an example charging station 102a with a housing assembly 200 having a dock 176 formed in or on the first housing 206, while FIG. 3b illustrates a set of side-by-side charging stations 102a with the dock 176 configured in a left-handed configuration 300a and a right-handed configuration 300b, respectively. For example, a user may desire a left-handed configuration 300a or a right-handed configuration 300b. A dock 176 that is reversible (e.g., via first housing 206) would mitigate complications where space is limited due to installation location vis-à-vis the vehicle connectors 110a, to address a user's preference (e.g., a left-headed user may prefer the left-handed configuration 300a) or where a uses wished to place two charging stations 102a side by side without having the vehicle connectors 110a potentially obstruct one another; an example of which is illustrated in FIG. 3b. The first housing 206 is configured for installation in either a first position or a second position. In the illustrated example, the first housing 206 can be rotated about its vertical axis 220 during installation to interchangeably place the dock 176 of charging station 102a in one of a plurality of configurations. For example, as illustrated, the dock 176 of charging station 102a can be placed in either a left-handed configuration 300a or a right-handed configuration 300b.

Figure 3C:
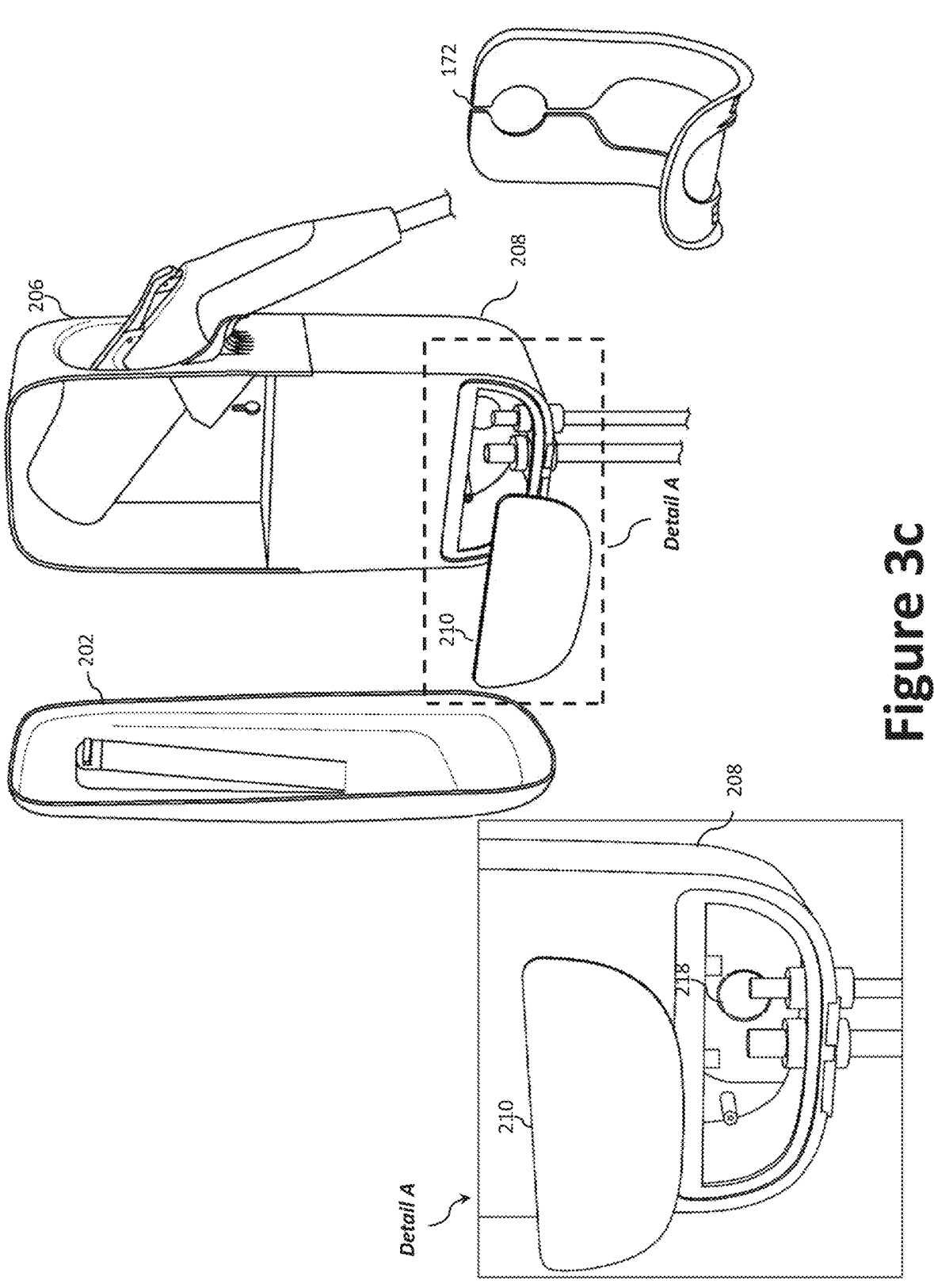
FIG. 3c illustrates the example charging station 102a of FIG. 3a with the front panel, access panel, and spool removed.

FIG. 3c illustrates the example charging station 102a in the right-handed configuration 300b and with the front panel 202, access panel 210, and spool 172 removed. Removing the front panel 202 allows the user to access the access panel 210, which can be removed to reveal the internal components of the second housing 208. For example, with referent to Detail A, the user can connect/disconnect the one or more circuit boards of the power electronics circuitry 212 from the electrical cable 180 and charge cable 110b. The use may also engage the release button 218 to disengage and release the spool 172 from the rear panel 204. The spool 172 can be attached to a wall separately from the remainder of the housing assembly 200. For example, the user may which to hang the loop of charge cable 110b next to the charging station 102a, instead of below the charging station 102a.

Figures 4A, 4B, 4C:
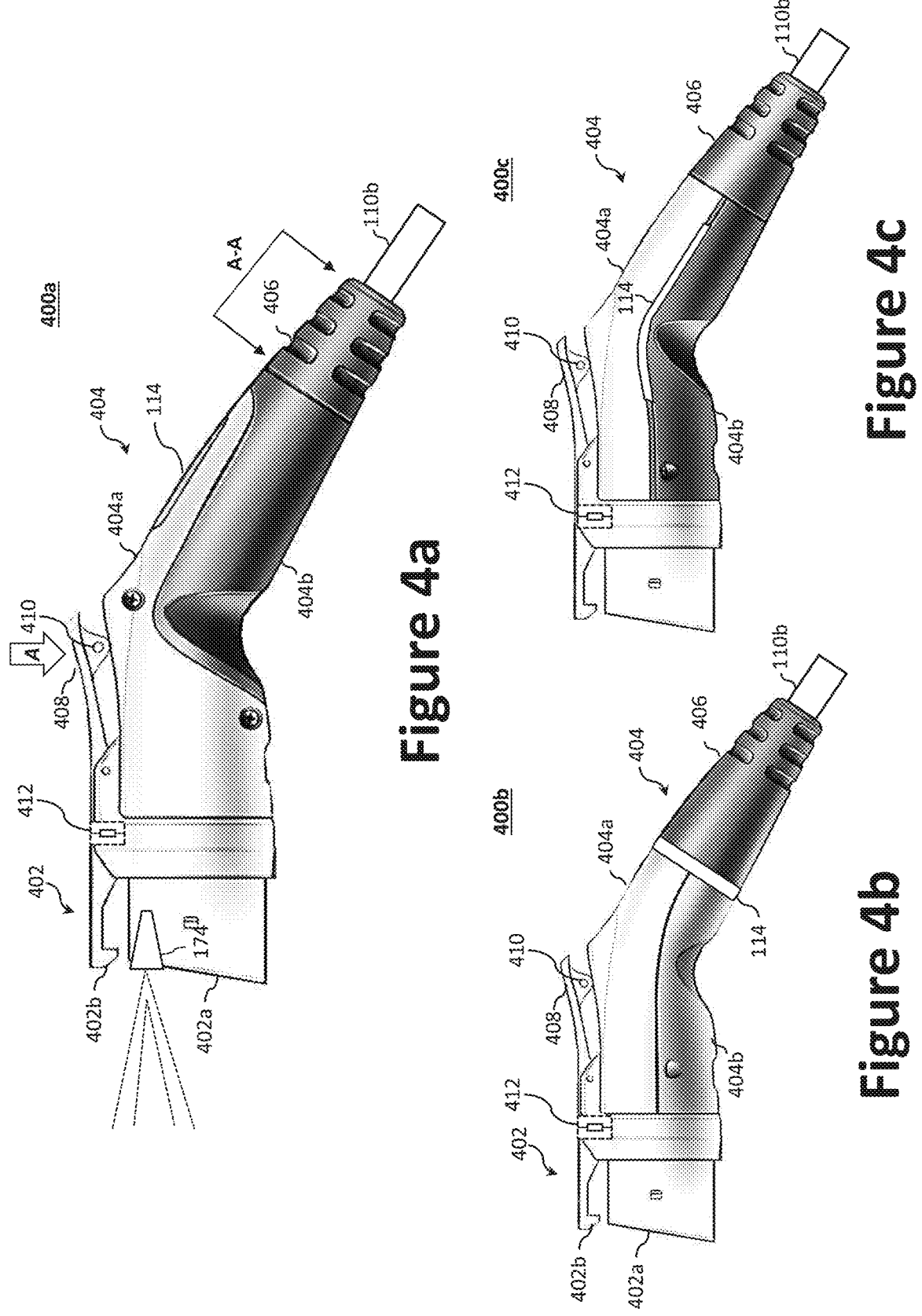
FIGS. 4a through 4c illustrate vehicle connectors in accordance with aspects of this disclosure.

FIGS. 4a through 4c illustrate, respectively, example vehicle connectors 110a (i.e., first, second, and third example vehicle connectors 400a, 400b, 400c) suitable for use with the automotive power system 100. As illustrated, each of the vehicle connectors 400a, 400b, 400c generally comprises a vehicle coupler 402, a handle portion 404, a flex coupling 406, a trigger 408, and display device 114. In some examples, the automotive power system 100 can be configured to authenticate or identify the vehicle connector 110a. For example, the vehicle connector 110a may include a tag (e.g., an RFID tag) or other readable medium that can be read by the automotive power system 100 and used to identify and/or authenticate the vehicle connector 110a before starting a charge cycle, for example.

The vehicle coupler 402 is coupled to a distal end of the handle portion 404 and generally comprises an electrical plug 402a (e.g., a set of pins) and latching mechanism 402b. The electrical plug 402a are configured to electrically couple with the vehicle 106, while the latching mechanism 402b is configured to mechanically engage the vehicle 106 (or the charging station 102a via the dock 176). The vehicle connector 110a can be, for example, a Type 1 or Type 2 connector for Level 1 or 2 charging and/or CHAdeMO or CCS connector for Level 3 charging (e.g., DC rapid charging). In one example, the vehicle connector 110a may be a SAE J1772, IEC 62196, Tesla connector, etc.

The handle portion 404 can be fabricated using two or more housings (e.g., an upper housing 404a and a lower housing 404b) secured to one another using mechanical fasteners (e.g., screws), welding (e.g., sonic welding), adhesive, or the like. The handle portion 404 can be overmolded with a soft and/or textured gripping material (e.g., a rubber, polymer, etc.) to increase comfort. The handle portion 404 includes a trigger 408 to release the latching mechanism 402b when pressed as indicated by arrow A. In some examples, the trigger 408 may comprise a locking mechanism 410 to prevent the trigger 408 from releasing the latching mechanism 402b, thereby preventing unauthorized users from disconnecting the vehicle connector 110a. In one example, the locking mechanism 410 is a lock hole through which a lock (e.g., a padlock) can be passed. With a lock installed through the lock hole, the trigger 408 would be physically prohibited from being engaged or otherwise pressed downward as indicated by Arrow A. In some examples, the latching mechanism 402b can be controlled by an actuator 412, which can be controlled using signals from a processor 128a. The actuator 412 is configured to lock and unlock the latching mechanism 402b. The handle portion 404 engages the charge cable 110b via a flex coupling 406.

The display device 114 may be provided on one or more surfaces of the vehicle connectors 400a, 400b, 400c. The display device 114 can be provided using a waveguide material that forms a part of the vehicle connectors 400a, 400b, 400c. For example, one of the panels, components, or portion thereof can be clear or translucent and illuminated via a light. In one example, the display device 114 can be provided on an outer surface of the upper housing 404a as illustrated in FIG. 4a. In another example, the display device 114 can be annular (e.g., a ring) and positioned between the handle portion 404 and flex coupling 406 as illustrated in FIG. 4b. In yet another example, the display device 114 can be run along the length of the handle portion 404 and positioned between the upper housing 404a and the lower housing 404b as illustrated in FIG. 4c. In some examples, the vehicle connector 110a may further include a light to assist the user in poorly lit environments. For example, a light assembly 174 (e.g., an LED or other light source) can be positioned on the vehicle connector 110a as illustrated in FIG. 4a and oriented to direct light outward from a distal end of the vehicle connector 110a (e.g., an area near or adjacent the pin connectors) to illuminate, for example, the charge port of the vehicle 106 when preparing the charge the vehicle 106. In some examples, the light assembly 174 may automatically illuminate when the vehicle connector 110a is removed from a dock 176 at the charging station 102a.

Figure 4D:
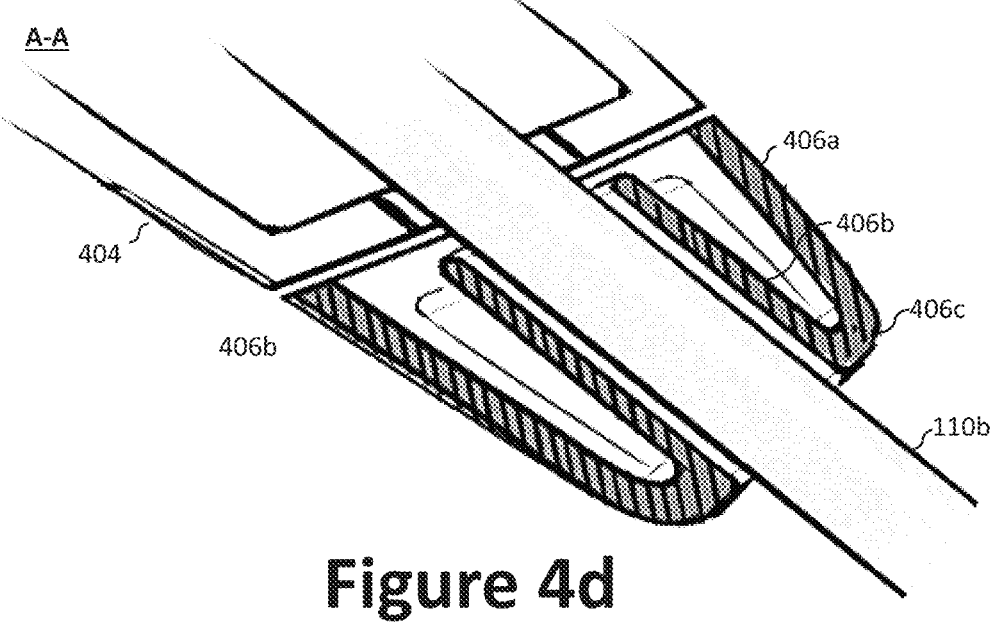
FIGS. 4d through 4e illustrate, respectively, side cross-sectional and perspective views of the flex coupling.
Figure 4E:
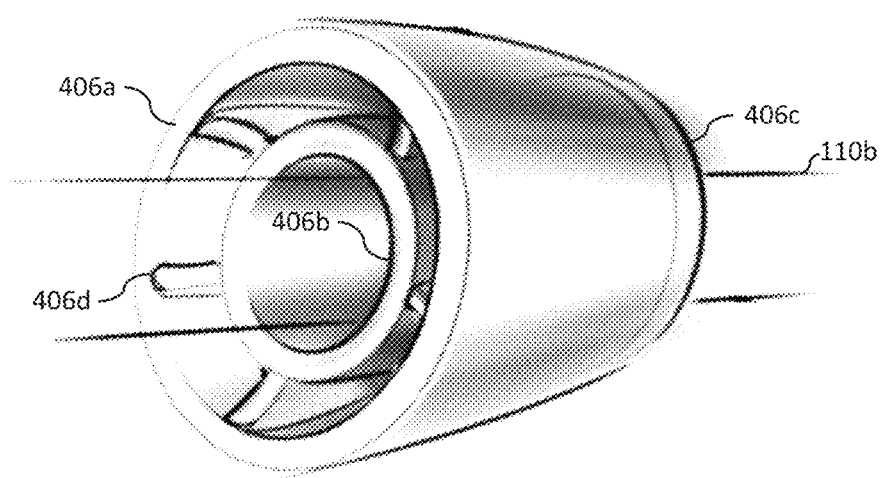

FIGS. 4d and 4e illustrate, respectively, a side cross-sectional and perspective views of the flex coupling 406. The side cross-sectional view is taken along line A-A in FIG. 4a. The charge cable 110b passes through the flex coupling 406, through the handle portion 404, and electrically engages the pins of the electrical plug 402a. The flex coupling 406 can be configured to absorb strain imparted on the handle portion 404 by the charge cable 110b. In some examples, the flex coupling 406 comprises a pair of concentric cups (i.e., an outer cup 406a and an inner cup 406b) joined at one end 406c and separated by a plurality of ribs

406d. As illustrated, the inner cup 406b is generally sized to surround a jacket of the charge cable 110b snuggly.

Figure 5A:
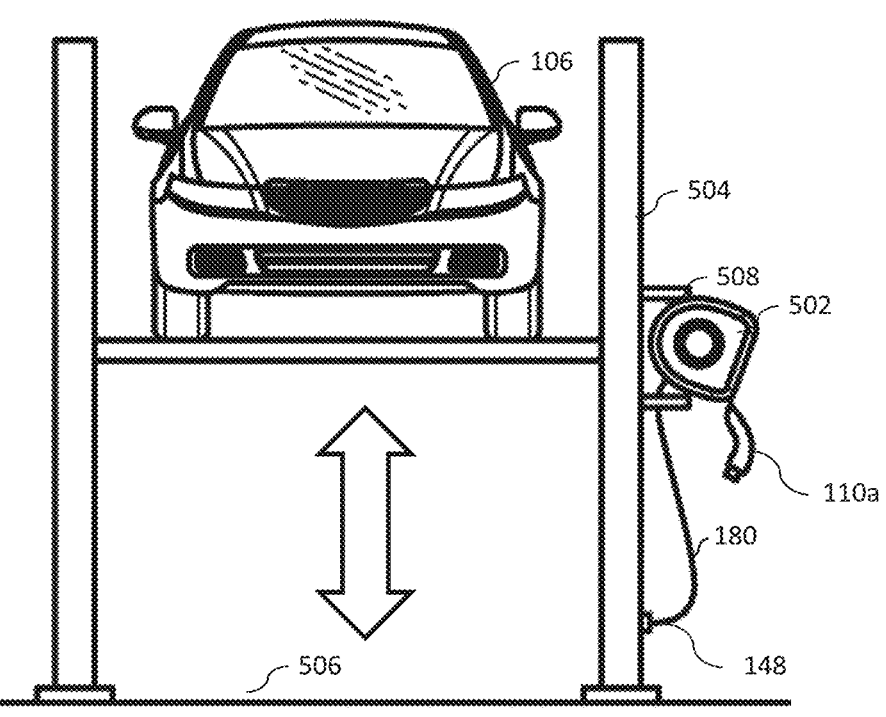
FIGS. 5a and 5b illustrate an example of the automotive power system embodied as a wall-mounted charging station in accordance with another aspect of this disclosure.
Figure 5B:
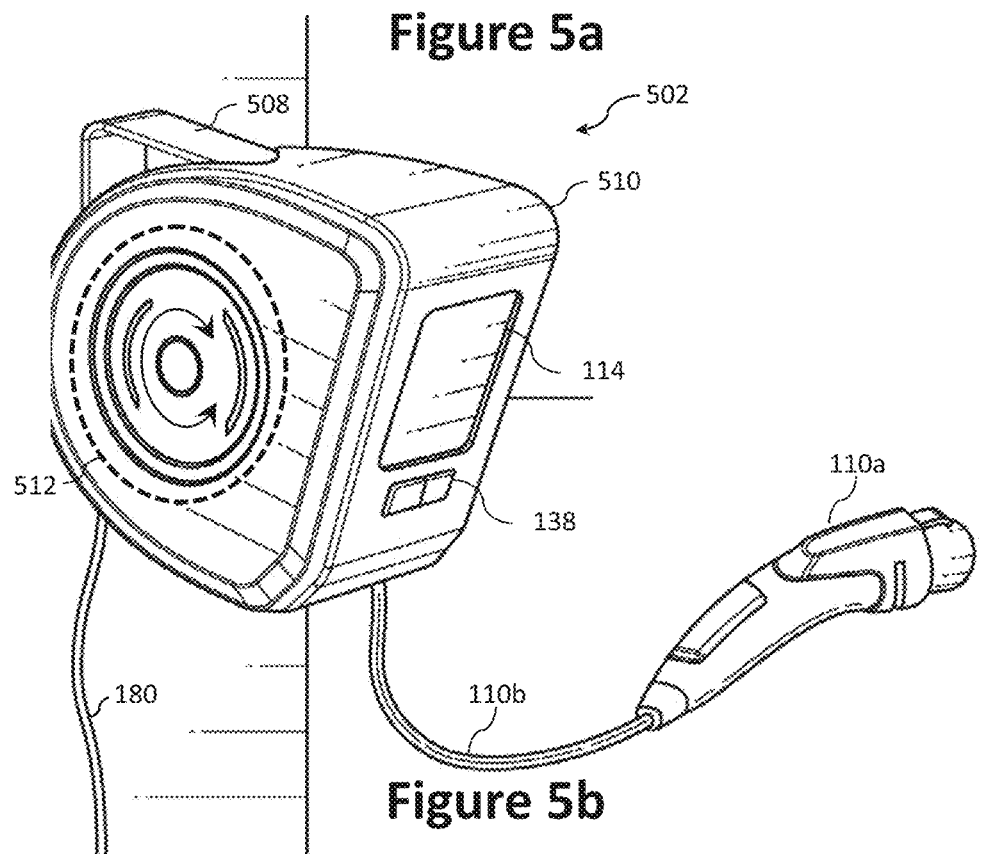
Figures 6A, 6B, 6C, 6D, 6E:
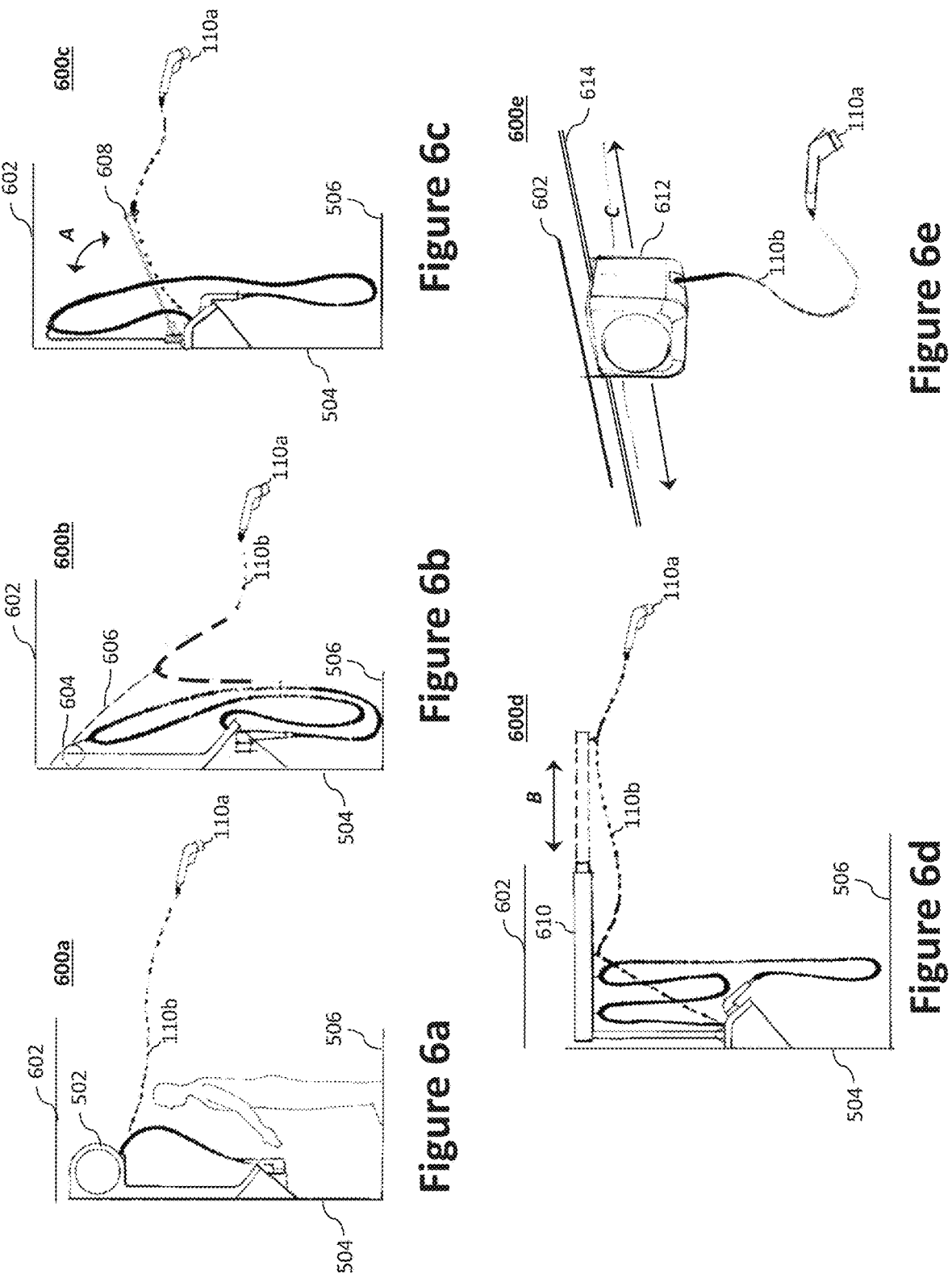
FIGS. 6a through 6e illustrate example cable management systems in accordance with aspects of this disclosure.

FIGS. 5a and 5b illustrate an example of the automotive power system 100 embodied as a wall mounted system. In this example, the automotive power system 100 includes a reel assembly 502 mounted to the vertical surface 504 via a bracket 508. The reel assembly 502 include and inner reel 512 that can be rotated to wind (pay in) and unwind (pay out) the charge cable 110b from the reel assembly 502, thereby providing the vehicle connector 110a with greater reach in an environment and keeping excess charge cable 110b stowed within the reel housing assembly 510 of the reel assembly 502. The vertical surface 504 may be a car lift (as illustrated in FIG. 5a), wall (as illustrated in FIG. 6a), or the like. The various power electronics (e.g., via one or more circuit boards) can be housed within or adjacent the reel housing assembly 510. The reel assembly 502 can be installed off the ground 506 such that the reel assembly 502 is out of the way and to provide easy access as the charge cable 110b is deployed. The reel assembly 502 can be controlled to rotate the inner reel 512 either manually with a hand-crank (or a similar structure) or electronically with a motor (or other actuator). In some examples, the reel assembly 502 may include a spring to bias the inner reel 512 such that the charge cable 110b defaults to a stowed state in the absence of a pull out tension. The outer portion of the reel housing assembly 510 may include a display device 114, or other user interface.

FIGS. 6a through 6e illustrate example cable management systems for use with the automotive power system 100 where the charge cable 110 is drawn in solid lines to represent a stowed state and in dotted lines to represent a deployed state. As can be appreciated, a longer charge cable 110b is more cumbersome and can become damaged by vehicles, tools, or other devices if it is left on the ground; thereby, potentially resulting in a safety hazard. Therefore, in some, in some examples, a cable management system can be used to dispense (pay out), retract (withdraw), and/or otherwise manage the charge cable 110b.

FIG. 6a illustrates a first example cable management system 600a. In this example, the first cable management system 600a includes a reel assembly 502 mounted to the vertical surface 504 (or the ceiling 602) that can be rotated to wind and unwind the charge cable 110b from the reel assembly 502, thereby providing the vehicle connector 110a with greater reach in an environment and keeping excess charge cable 110b stowed on the reel assembly 502. The reel assembly 502 can be installed off the ground 506 (e.g., 5-10 feet) such that it is out of the way and to provide easy access as the charge cable 110b is deployed. The reel assembly 502 can be controlled either manually with a hand-crank (or a similar structure) or electronically with a motor (or other actuator). In some examples, the reel assembly 502 may include a spring to bias the reel assembly 502 such that the charge cable 110b defaults to a stowed state.

FIG. 6b illustrates a second example cable management system 600b. In this example, the cable management system 600b include a lead retractor 604 mounted to the vertical surface 504 (or the ceiling 602) that can pull excess charge cable 110b off the ground 506 via a lead 606 (cable, rope, string, etc.). For example, the lead retractor 604 may include a spool that pays out/retracts a lead 606 that is attached, via its distal end, to the charge cable 110b. By reeling in the lead 606 via the lead retractor 604, excess charge cable 110b is lifted off the ground 506.

FIG. 6c illustrates a third example cable management system 600c. In this example, the cable management system 600c include a rigid cord support 608 pivotally mounted to the vertical surface 504 at its proximal end and to the charge cable 110b at its distal end. The rigid cord support 608 is configured to pivot upward toward the ceiling 602 to pull excess charge cable 110b off the ground 506 as indicated by arrow A. In some examples, the cable management system 600c may include a spring to bias the rigid cord support 608 toward the ceiling 602 such that the charge cable 110b defaults to a stowed state.

FIG. 6d illustrates a fourth example cable management system 600d. In this example, the cable management system 600d include an extendable boom 610 mounted to the vertical surface 504 or the ceiling 602 and couple to the charge cable 110b at its distal end. The extendable boom 610 is configured to extend and retract parallel to the ceiling 602 as indicated by arrow B to pull excess charge cable 110b off the ground 506.

FIG. 6e illustrates a fifth example cable management system 600e. In this example, the cable management system 600e include a shuttle 612, which may include a reel assembly, mounted to the ceiling 602. In one example, the shuttle 612 can be configured to deploy and/or retract charge cable 110b from a reel. In another example, the shuttle 612 can be configured to translate along the ceiling 602 as indicated by arrow C via, for example, a track 614.

Figures 7A, 7B, 7C:
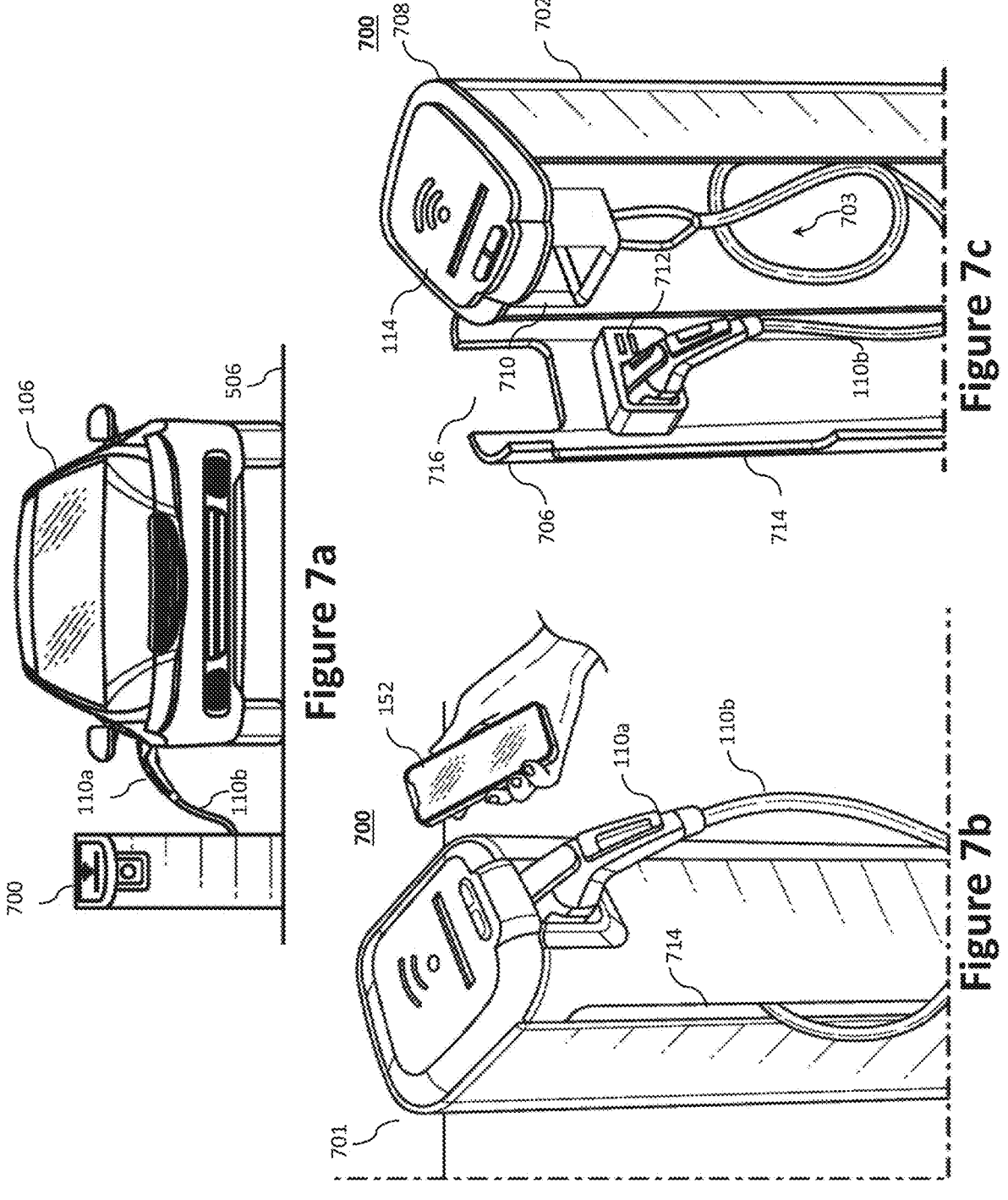
FIGS. 7a through 7c illustrate an example of the automotive power system embodied as a ground-mounted charging station in accordance with an aspect of this disclosure.

FIGS. 7a through 7c illustrate an example of the automotive power system 100 embodied as a ground-mounted charging station 700. As illustrated, the ground-mounted charging station 700 generally comprises a ground-mounted housing assembly 701 composed of a main housing 702, a top panel 708, and a moveable panel 706 (e.g., a door or access panel). The exterior portion of the top panel 708 may include a display device 114, or other user interface. The ground-mounted housing assembly 701 can be bolted or otherwise secured to the ground 506.

The main housing 702 generally defined a cavity 703 to house the charge cable 110b (or portion thereof). The main housing 702 may further comprise an outward-facing dock 710 (e.g., like the dock 176 described above) to secure the vehicle connector 110a. The moveable panel 706 may include a first cutout 716 to provide access to the outward-facing dock 710 such that the vehicle connector 110a can be docked and undocked when the moveable panel 706 is in the closed position. The moveable panel 706 may further include one or more second cutouts 714 (e.g., on each side of the moveable panel 706) to allow the charge cable 110b to exit the cavity 703 without obstructing the moveable panel 706 when in the closed position. The moveable panel 706 may further comprise on its interior surface an inward-facing dock 712. The inward-facing dock 712 can be used to secure the vehicle connector 110a within the cavity 703. For example, if user does not anticipate using the charger for an extended period of time, the vehicle connector 110a can be stored within the cavity 103 with the charge cable 110b and protected from the elements.

FIGS. 8a and 8b illustrate an example of the automotive power system 100 embodied as a plug-in charging cord assembly 800. As illustrated, the plug-in charging cord assembly 800 may comprise a vehicle connector 110a at a first end of the charge cable 110b to releasable coupled with the vehicle 106. In some examples, the vehicle connector 110a may be removably attached to the in-line controller 802 (or to the charging station 102a) via a connector 804 (e.g., a threaded connector, a quick connector, etc.) to enable the operator to switch the type of vehicle connector 110a. In one example, the plug-in charging cord assembly 800 can be provided as a kit with various interchangeable vehicle connectors 110a (e.g., an SAE J1772, an IEC 62196, and a Tesla connector) to facilitate compatibility with different geographic regions and/or automobile manufacturers. A threaded connector can be used as the connector 804 instead of a quick connector to mitigate voltage drop.

A second end of the charge cable 110b is coupled to a source of charging power. In one example, the second end of the charge cable 110b is releasably coupled with, for example, the mains power 148 via a power connector 806 coupled to the electrical cable 180. The power connector 806 maybe, for example, a standard electrical plug, such as one of Types A, B, C, G, H, or I. An adapter 808 can be used to covert the power connector 806 from one standard to another (e.g., for international travel or usage). By way of illustration, the charging cord assembly 110 can be provided as a kit with various interchangeable power connectors 806 to facilitate compatibility with different geographic regions. The light assembly 174 may automatically illuminate when the vehicle connector 110a is plugged into a mains power 148 via a power connector 806. As explained above, the charging cord assembly 110 may be a Level 1 or Level 2 charger and, to that end, the interchangeable power connectors 806 can be switched accordingly. In some examples, the electrical cable 180 can be releasably coupled with the in-line controller 802.

Various functionality of the automotive power system 100 can be provided via an in-line controller 802. In other words, the in-line controller 802 houses the power electronics, which may include a processor 128a, one or more memory devices 128b, one or more sensors 140, power-management circuit 132, user interface 138, switches 182, etc. to control power transfer and enable user interaction. For example, the in-line controller 802 can selectively transfer and convert power between the vehicle connector 110a and the power connector 806. For example, in-line controller 802 may receive mains voltages via the power connector 806 and output a charging power to the vehicle 106 based on, for example, a pilot signal from the vehicle 106. In another example, the in-line controller 802 may receive power from the automotive battery 104 of the vehicle 106 and output an AC via the power connector 806 when the mains power 148 is unavailable—allowing the vehicle 106 to function as a backup power supply in the event of a power outage. In yet another example, a second vehicle connector 110a can be provided at the second end in lieu of the power connector 806 to enable a vehicle-to-vehicle connection. In this example, power from one vehicle can be used to charge the vehicle 106. Similarly, in another example, the pair of clamps, ring terminals, or other terminals can be provided at the second end in lieu of the power connector 806 to enable the vehicle 106 to charge or jump start a vehicle with an internal combustion engine. In this example, power from the vehicle 106 can be converted to a jump start current (and voltage, e.g., 12-16 volts) to start the internal combustion engine.

While a portable charging cord assembly 110 can be helpful when on the road, finding an available power outlet can be challenging and, even when an outlet is available, the property owner may object to users drawing current for free. While many charging stations offer monthly services, it can be advantageous to provide an outlet that calculates power usage and charges the vehicle owner for only the amount of watts drawn. Such smart outlets can measure the power used during a charge session via a current-measuring transformer and report the amount of power back to a central station (e.g., in the building) via, for example, Wi-Fi, a power line carrier, or other communication technique. Because dedicated outlets for individuals is nearly impossible in public parking structures, each outlets may have a user interface into which a user ID and password (or pin number) can be entered. In one example, each parking space may include an outlet (or 110) with a small key pad into which the operator or garage attendant can enter in the cars unique ID number (e.g., unit number, plate number, etc.) and password upon parking.

Figures 9A, 9B, 9C:
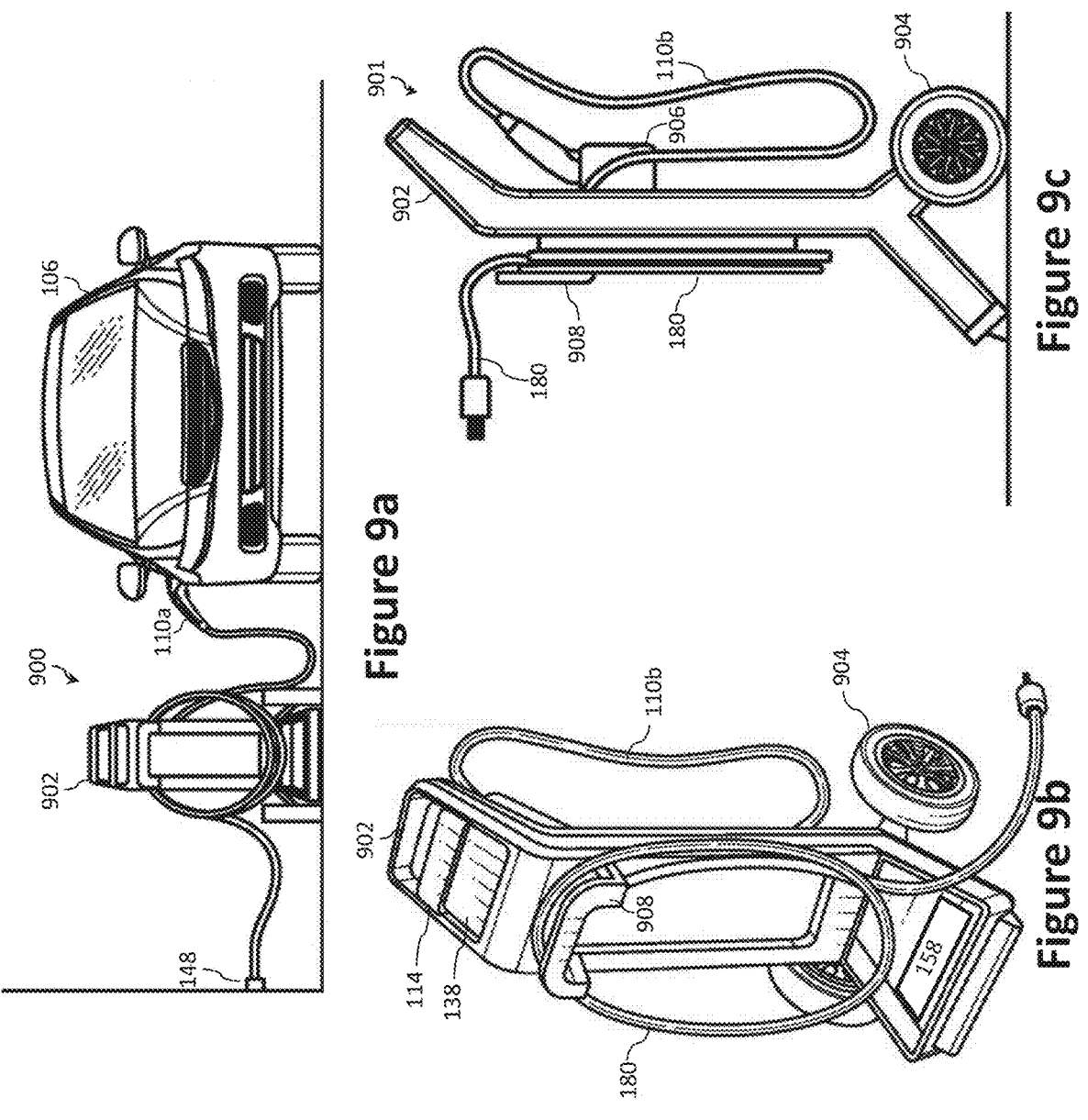
FIGS. 9a through 9c illustrate an example of the automotive power system embodied as a cart-mounted charging station in accordance with an aspect of this disclosure.

FIGS. 9a through 9c illustrate an example of the automotive power system 100 embodied as a cart-mounted charging station 900. As illustrated, the cart-mounted charging station 900 generally comprises a cart-based housing assembly 901 composed of a cart frame 902 and set of wheels 904). An upper end of the cart frame 902 may include a display device 114, or other user interface. The cart-mounted charging station 900 can be ported from location to location depending on charging needs. In one examples, the electrical cable 180 can be coupled to the mains power 148 to draw power to charge the vehicle 106 via the vehicle connector 110a. In other example, the cart-mounted charging station 900 may alternative lot additionally draw power to charge the vehicle 106 from a power bank 158. Due to weight, the power bank 158 can be positioned at the bottom of the cart frame 902 to increase stability. The cart-mounted charging station 900 may include a dock 906 to store the vehicle connector 110a when not in use and a spool 908 to store electrical cable 180 when not in use.

Figures 10A, 10B, 10C:
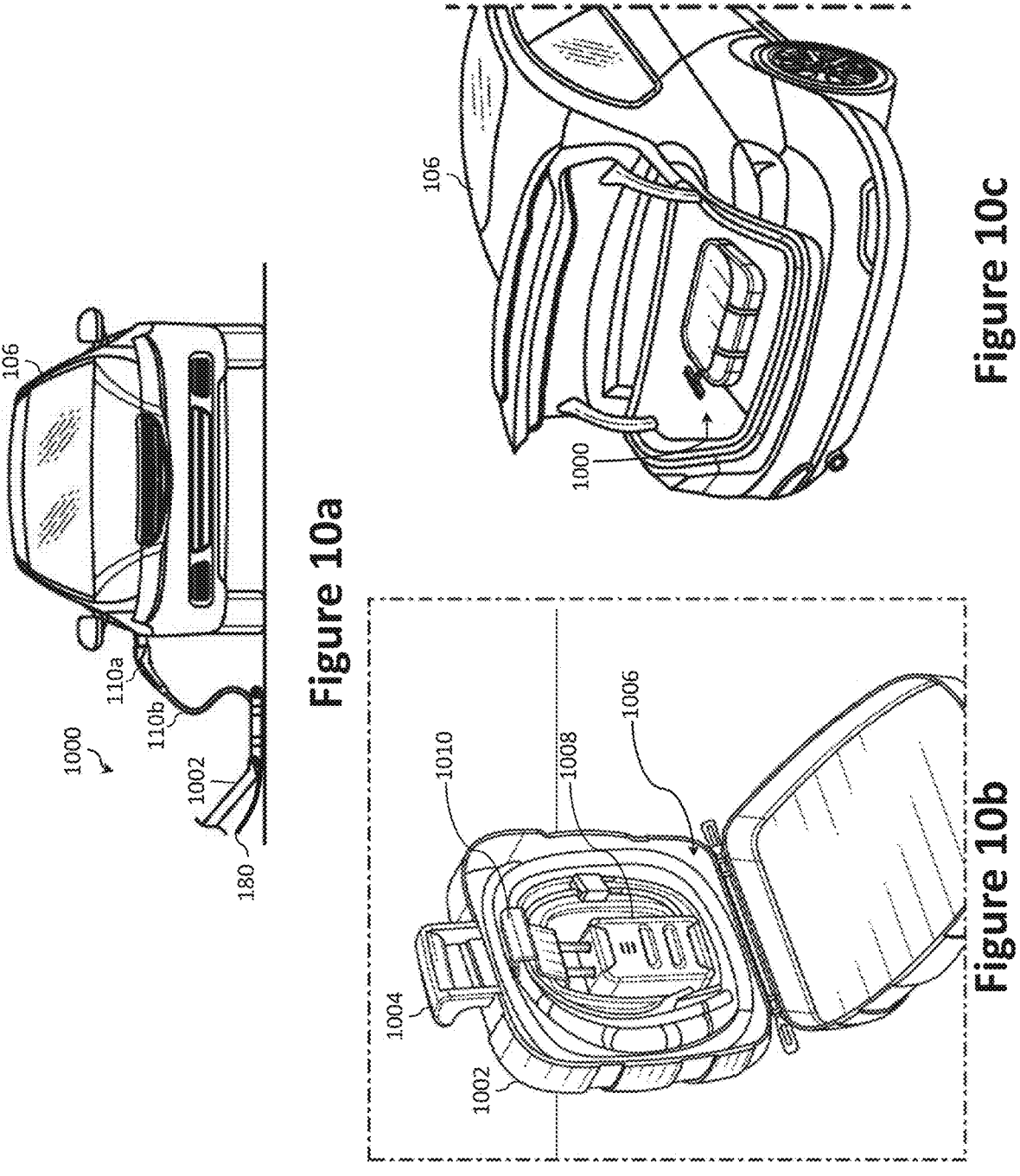
FIGS. 10a through 10c illustrate an example of the automotive power system embodied as a case-mounted charging station in accordance with an aspect of this disclosure.

FIGS. 10a through 10c illustrate an example of the automotive power system 100 embodied as a case-mounted charging station 1000. The case-mounted charging station 1000 comprise a case-based housing assembly 1002 (e.g., a clam-shell case). The case-based housing assembly 1002 may include a handle 1004 and may be sized and shaped to be stored in the vehicle 106 (e.g., in the trunk). In some examples, the case-based housing assembly 1002 may be sized and shaped (e.g., compact and round) to fit within a hub of the spare tire. The case-based housing assembly 1002 defined a cavity 1006, which stores the charging components of the automotive power system 100. For example, the cavity 1006 would house vehicle connector 110a, charge cable 110b, electrical cable 180, and a controller 1008 (akin to the in-line controller 802). The controller 1008 can be provided in a housing of the case-based housing assembly 1002 that is integral with the case-based housing assembly 1002 or removably coupled with the case-based housing assembly 1002. The case-based housing assembly 1002 may further comprise one or more spools 1010 to manage the various cables (e.g., charge cable 110b and electrical cable 180).

Figures 11A, 11B, 11C:
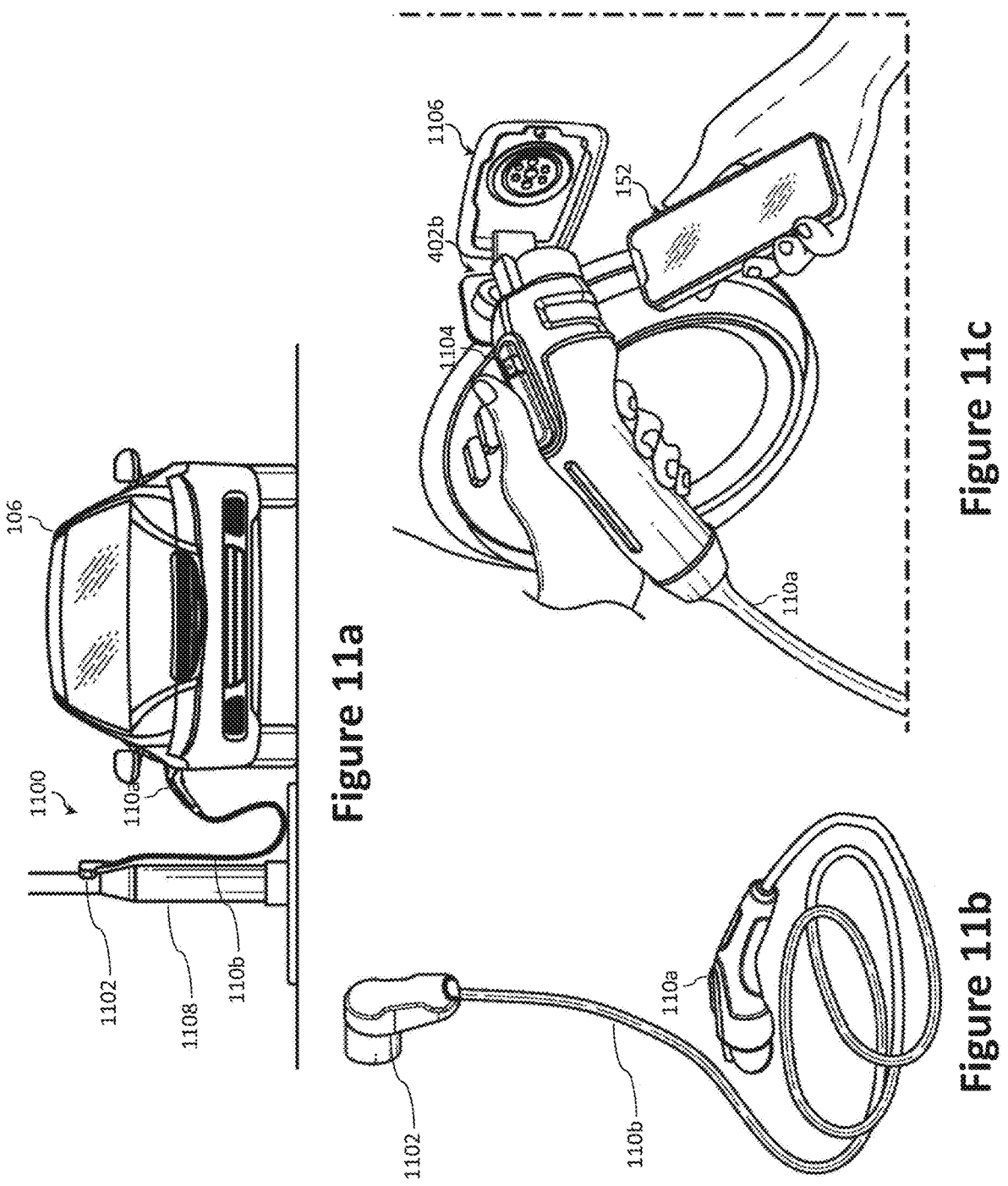
FIGS. 11a through 11c illustrate an example of the automotive power system embodied as a plug-in charging cord assembly with lockout in accordance with an aspect of this disclosure.

FIGS. 11a through 11c illustrate an example of the automotive power system 100 embodied as a plug-in charging cord assembly with lockout 1100. The plug-in charging cord assembly with lockout 1100 generally comprises a vehicle connector 110a and a charge cable 110b configured to connect to a charging station 1108 (or other source of power) via a power connector 1102. The processing circuitry of the automotive power system 100 can be positioned in the power connector 1102, the charging station 1108, or a combination thereof. For example, if the charging station 1108 simply provides a connection to mains power 148, then the processing circuitry to control power supply from the power connector 1102 to the vehicle connector 110a can be positioned in the power connector 1102 much in the same manner as the in-line controller 802, described above.

As can be appreciated, it can be desirable to lock or otherwise secure the automotive power system 100 to prevent unauthorized use or tampering. For example, in a public space, an operator may lock the vehicle connector 110a such that the vehicle connector 110a cannot be physically disconnect from the vehicle 106. The latching mechanism 402b, which is configured to mechanically engage a charge port 1106 of the vehicle 106 as described above, can be selectively controlled (e.g., via an actuator 412) to lock onto the vehicle 106 (e.g., at the charge port 1106). The latching mechanism 402b can be disengaged via the actuator 412 upon a receiving a disengage signal (e.g., a disengage signal from processor 128a). The disengage signal can be sent in response to an input from an authorized user. The input may be from, for example, a portable electronic device 152 (e.g., via point-to-point communication, such as Bluetooth, or over a communication network 170) or an onboard interface. For example, the onboard interface can be a keypad 1104 positioned on an exterior surface of the vehicle connector 110a. They keypad may include alphanumeric buttons though which the operator can enter login credential (e.g., a password, personal identification number (PIN), etc.). The keypad 1104 may be physical (e.g., using physical buttons) or digital (e.g., using soft buttons via a touch screen). In some examples, the keypad 1104 may include a biometric reader (e.g., a biometric fingerprint scanner). Additionally or alternatively, the keypad 1104 can be used to control or authorize current flow. For example, the keypad 1104 can be used to authorize current flow for authorized users (e.g., by closing a relay) and to prohibit current flow for unauthorized users (e.g., by opening the relay).

Figure 12A:
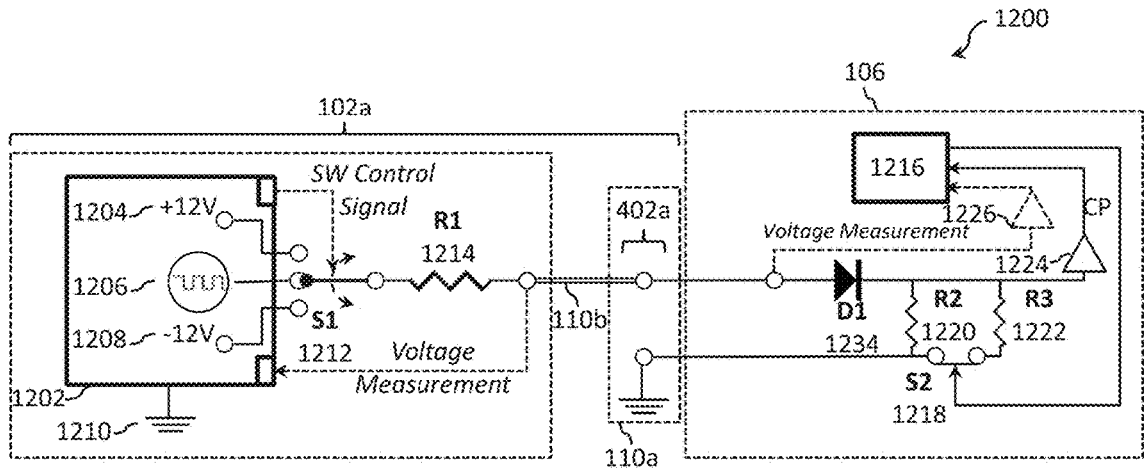
FIGS. 12a and 12b illustrate, respectively, block and timing diagrams of a pilot signal between the vehicle and the automotive power system in accordance with an aspect of this disclosure.

FIG. 12a illustrates a block diagram of the control pilot circuitry 1200 between the vehicle 106 and the automotive power system 100 (e.g., the charging station 102a, as illustrated, and the in-line controller 802). A diode (D1) 1234 is provided to prevent back feed of power to the automotive power system 100. As illustrated, the charging station 102a comprises a controller 1202 connected to ground 1210 and configured to output one or more of +12 VDC supply 1204, a PWM signal supply 1206, and a −12 VDC supply 1208 as a control pilot (CP) signal 1230 via switch (S1) 1212 and resistor (R1) 1214. In some examples, the PWM signal supply 1206 has a duty cycle of 50%. The controller 1202 can be provided via the processor 128a, the power-management circuit 132, or a combination thereof. The controller 1202 controls switch (S1) 1212 between the three positions via a control signal. As illustrated, the switch (S1) 1212 can be a single pole triple throw (SP3T) switch. The switch (S1) 1212 can be a mechanical switch or a solid state switch. Using resistor (R1) 1214, a voltage measurement at the electrical plug 402a can be measured and fed back to controller 1202 as an input. The control pilot (CP) signal 1230 passes to the battery controller 1216 via a buffer 1224. In some examples, the battery controller 1216 may receive a voltage measurement of the power supplied by the automotive power system 100 via buffer 1226. The vehicle 106 comprises a battery controller 1216 configured to selectively open and close switch (S2) 1218, which is electrically coupled between a set of parallel resistors (i.e., resistors (R2) 1220 and (R3) 1222). In some examples, resistor (R1) 1214 is 1 kΩ, resistor (R2) 1220 is 2.74 kΩ, and (R3) 1222 is 1.3 kΩ.

Figure 12B:
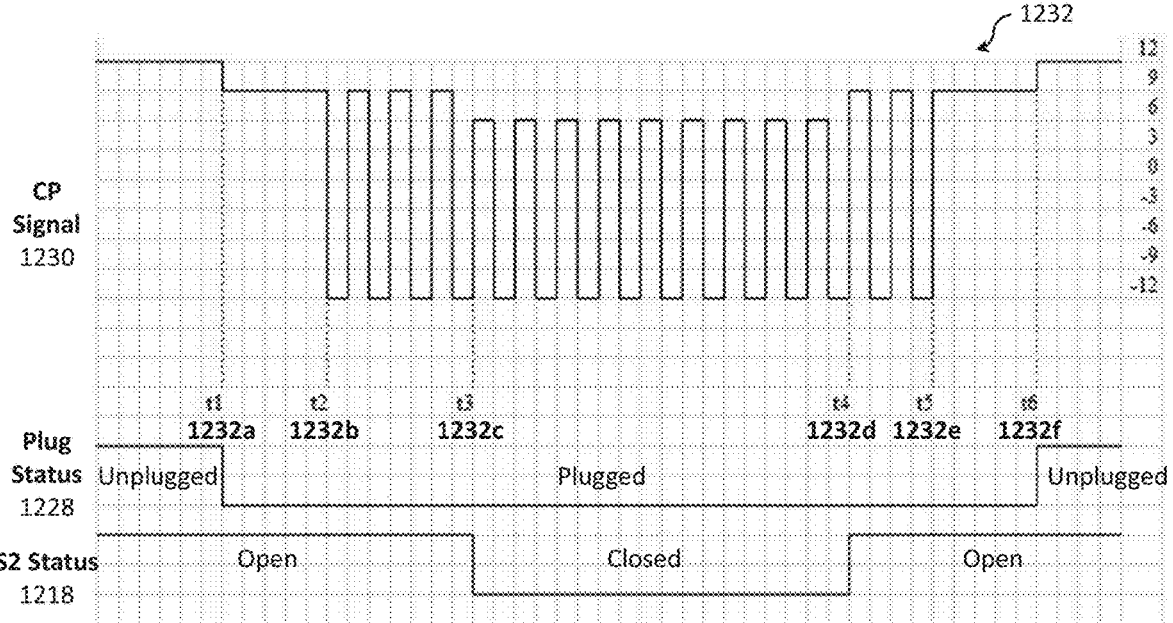

FIG. 12b illustrates a timing diagram of a control pilot (CP) signal 1230 during an example charge session 1232 using the control pilot circuitry 1200. As illustrated, during the example charge session 1232, a voltage of the control pilot (CP) signal 1230 provided changes during multiple timing segments (e.g., times 1232a, 1232b, 1232c, 1232d, 1232e, 1232f). As illustrated, the voltage of the control pilot signal fluctuates between +12 VDC and −12 VDC during the charge session 1232 (i.e., the actual voltage may be a voltage that is between +12 VDC and −12 VDC due to power losses through circuit components).

Before time t1 1232a, switch (S1) 1212 is switched to +12 VDC supply 1204 to provide a control pilot (CP) signal 1230 of +12 VDC. At time t1 1232a, the vehicle connector 110a is electrically coupled to the vehicle 106, as indicated by the plug status signal 1228. The charging station 102a can detect whether or not the vehicle connector 100a is coupled to the vehicle 106 using the plug status signal 1228. At this point, the control pilot (CP) signal 1230 passes to the vehicle 106 through the diode (D1) 1234 (experiencing a 0.7 VDC drop), through resistors (R2) 1220, (R3) 1222, and a buffer 1224 before reaching the battery controller 1216. The voltage of the control pilot (CP) signal 1230 received by the vehicle 106 at time t1 1232a is 9 VDC (i.e., (12 VDC−0.7 VDC)/ (3.74×2.74+0.7)=8.98V).

At time t2 1232b, the charging station 102a receives a start command from the user interface 138, for example, and starts a charge session 1232. At this time, switch (S1) 1212 is switched to PWM signal supply 1206 via switch control signal to a control pilot (CP) signal 1030 as a PWM signal. Due to the diode (D1) 1034, the negative of the PWM control pilot (CP) signal 1030 is −12V, thus yielding a control pilot (CP) signal 1030 that alternates between −12V and 9V.

At time t3 1032c, the vehicle 106 closes switch (S2) 1018 via battery controller 1016 to send a response to the charging station 102a. Upon receipt of the response, the charging station 102a closes switch 182 to provide a charging power to the vehicle 106. At this time, the control pilot (CP) signal 1030 passes through diode (D1) 1034, through parallel resistors (i.e., resistor (R3) 1022∥ resistor (R2) 1020), and then to the battery controller 1016. As a result, the positive of the PWM control pilot (CP) signal 1030 is 6V. In other words, control pilot (CP) signal 1030 alternates between −12V and 6V.

At time t4 1032d, the vehicle 106 opens switch (S2) 1018 via battery controller 1016 indicated charge complete and, in response, the charging station 102a opens the switch 182 to stop providing the charging power. Because switch (S2) 1018 is open, then PWM signal alternates between −12V and 9V.

At time t5 1032e, the charging station 102a stops the PWM signal supply 1206 by switching the switch (S1) 1012 switch to +12V. At this point, the control pilot (CP) signal 1030 will be 9V. At time t6 1032f, the vehicle connector 110a is removed from vehicle 106.

FIGS. 8a through 8f illustrate additional example charging station features and configurations in accordance with aspects of this disclosure.

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. An automotive power system for supplying a charging power to a vehicle using mains power, the automotive power system comprising:

power electronics circuitry, wherein the power electronics circuitry comprises a processor configured to control a switch;

a charge cable electrically connected with the power electronics circuitry and configured to convey the charging power from the power electronics circuitry to the vehicle via a vehicle connector; and a housing assembly configured to house the power electronics circuitry, wherein the housing assembly is composed of a first housing and a second housing, wherein the first housing defines a dock to secure the vehicle connector and the second housing comprises the power electronics circuitry, wherein the first housing configured to attach at an attachment location and to stow the vehicle connector in one of a plurality of configurations, and wherein the first housing defines a vertical axis and is configured for installation at the attachment location in either a first position associated with a left-handed configuration and, once the first housing is rotated about the vertical axis, a second position associated with a right-handed configuration.

2. The automotive power system of claim 1, wherein the second housing comprises an access panel, which can be removed to provide access to the power electronics circuitry.

3. The automotive power system of claim 1, wherein the dock comprises a latch or magnet configured to retain the vehicle connector in the dock.

4. The automotive power system of claim 1, further comprising a power bank, wherein the power electronics circuitry is configured to supply the charging power to the vehicle using power stored to the power bank.

5. The automotive power system of claim 1, further comprising a wireless device operatively coupled with said processor to communicatively couple the automotive power system with a portable electronic device.

6. The automotive power system of claim 5, wherein the processor is configured to communicate usage data wirelessly to the portable electronic device, wherein the usage data includes a total amount of charging power provided to the vehicle during a charging session in watts or kilowatts.

7. The automotive power system of claim 5, wherein the processor is configured to receive one or more commands wirelessly from the portable electronic device, wherein the one or more commands include an instruction to fully charge the vehicle by a given date and time.

8. The automotive power system of claim 7, wherein the processor is configured to select charging periods in which to supply the charge power as a function of time of day, household power usage, weather, temperature, or utility rates.

9. The automotive power system of claim 1, wherein the vehicle connector comprises a latching mechanism that is configured to mechanically engage a charge port of the vehicle, wherein the latching mechanism comprises an actuator configured to lock and unlock the latching mechanism.

10. The automotive power system of claim 9, wherein the processor is configured to control the actuator based on an operator input provided wirelessly via a portable electronic device.

11. The automotive power system of claim 10, wherein the processor is configured to control the actuator based on a login credential provided via a keypad positioned on the vehicle connector.

12. The automotive power system of claim 11, wherein the login credential is a fingerprint.

13. An enclosure system for use with an automotive charging unit, the enclosure system comprising:

a first housing defining a dock configured to retain a vehicle connector of a charge cable; and a second housing configured to contain power electronics circuitry electrically connected to the vehicle connector;

wherein the first housing is configured to mount to the second housing at an attachment location, wherein the first housing defines a vertical axis and is mountable at the attachment location in a first orientation associated with a left-handed configuration and, upon rotation about the vertical axis, in a second orientation associated with a right-handed configuration, and wherein the first and second orientations correspond to different positions of the dock relative to the attachment location.

14. The enclosure system of claim 13, wherein the attachment location comprises a keyed or symmetrical mount allowing the first housing to be selectively rotated into the first or second orientation during installation.

15. The enclosure system of claim 13, wherein the dock comprises a latching mechanism to retain the vehicle connector when stowed.

16. The enclosure system of claim 13, wherein the dock comprises a magnet configured to retain the vehicle connector when stowed.

17. The enclosure system of claim 13, wherein the second housing includes an access panel that is removably secured to allow servicing of the power electronics circuitry.

18. An automotive charging system comprising:

a charge cable configured to deliver charging power to a vehicle via a vehicle connector;

a housing assembly comprising:

a first housing defining a dock configured to retain the vehicle connector when not in use;

and a second housing configured to enclose control or power electronics associated with vehicle charging;

wherein the first housing is configured to be mounted to the second housing at an attachment location;

wherein the first housing defines a vertical axis and is mountable in a first orientation associated with a left-handed configuration, and, upon rotation about the vertical axis, in a second orientation associated with a right-handed configuration;

and wherein the first and second orientations correspond to different lateral positions of the dock relative to the attachment location.

19. The automotive charging system of claim 18, wherein the dock comprises a latching mechanism or a magnet configured to retain the vehicle connector when stowed.

20. The automotive charging system of claim 18, wherein the second housing includes an access panel that is removably secured to allow servicing of the control or power electronics.

*  *  *  *  *